(12) United States Patent
Lee et al.

(10) Patent No.: US 10,996,733 B2
(45) Date of Patent: May 4, 2021

(54) APPARATUS AND METHOD FOR MANAGING POWER CONSUMPTION IN ELECTRONIC DEVICE

(71) Applicant: Samsung Electronics Co., Ltd, Suwon-si (KR)

(72) Inventors: Wonbo Lee, Suwon-si (KR); Youngki Hong, Suwon-si (KR); Niladri Ray, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 16/206,603

(22) Filed: Nov. 30, 2018

(65) Prior Publication Data

US 2019/0163250 A1   May 30, 2019

(30) Foreign Application Priority Data

Nov. 30, 2017 (KR) .................. 10-2017-0163733

(51) Int. Cl.
| | |
|---|---|
| *G06F 1/3206* | (2019.01) |
| *G06F 1/3234* | (2019.01) |
| *G06Q 10/04* | (2012.01) |
| *G06F 11/30* | (2006.01) |

(52) U.S. Cl.
CPC .......... *G06F 1/3206* (2013.01); *G06F 1/3234* (2013.01); *G06F 11/3062* (2013.01); *G06Q 10/04* (2013.01); *Y02D 10/00* (2018.01)

(58) Field of Classification Search
CPC ........ G06F 1/32; G06F 1/3203; G06F 1/3206; G06F 1/3215; G06F 1/3234;
(Continued)

(56) References Cited

U.S. PATENT DOCUMENTS

| | | | | |
|---|---|---|---|---|
| 2004/0041538 | A1* | 3/2004 | Sklovsky | ......... H04W 52/0264 320/127 |
| 2004/0049321 | A1* | 3/2004 | Lehr | ...................... H04L 12/10 700/286 |

(Continued)

FOREIGN PATENT DOCUMENTS

CN    103428320 A    12/2013

OTHER PUBLICATIONS

Zhang, Lide, et al. "Accurate Online Power Estimation and Automatic Battery Behavior Based Power Model Generation for Smartphones". CODES+ISSS '10. Oct. 24-29, 2010. ACM. (Year: 2010).*

(Continued)

*Primary Examiner* — Thomas J. Cleary

(57) ABSTRACT

An apparatus and a method for managing power consumption for each power consumption element in an electronic device and updating a power profile is disclosed. The electronic device estimates current power consumption of the electronic device based on unit power consumption corresponding to each target hardware component set in the power profile and monitors whether an update of the power profile is required. If it is determined that the update of the power profile is required, the electronic device may update the power profile corresponding each target hardware component by consumption estimated in accordance with each target hardware component and consumption measured in accordance with each target hardware component.

20 Claims, 13 Drawing Sheets

(58) Field of Classification Search
CPC ............. G06F 11/3051; G06F 11/3055; G06F 11/3058; G06F 11/3062; G06Q 10/04; Y02D 10/00

See application file for complete search history.

(56) References Cited

U.S. PATENT DOCUMENTS

| | | | | |
|---|---|---|---|---|
| 2010/0005326 | A1* | 1/2010 | Archer | G06F 1/32 713/320 |
| 2011/0066727 | A1* | 3/2011 | Palmer | H04L 67/1008 709/224 |
| 2013/0046967 | A1* | 2/2013 | Fullerton | H03L 7/0997 713/100 |
| 2016/0078347 | A1* | 3/2016 | Salajegheh | G06F 11/3452 706/12 |
| 2017/0265325 | A1* | 9/2017 | Klikic | H05K 7/1489 |
| 2017/0371394 | A1* | 12/2017 | Chan | G06F 1/3218 |
| 2018/0367043 | A1* | 12/2018 | Dotson | H04B 17/21 |
| 2019/0332157 | A1* | 10/2019 | Hsu | G06F 1/3206 |

OTHER PUBLICATIONS

Shye, Alex, et al. "Into the Wild: Studying Real User Activity Patterns to Guide Power Optimizations for Mobile Architectures". MICRO '09. Dec. 12-16, 2009. ACM. (Year: 2009).*

Kjaergaard, Mikkel Baun, et al. "Unsupervised Power Profiling for Mobile Device". 2012. Institute for Computer Sciences, Social Informatics and Telecommunications Engineering. (Year: 2012).*

Hoque, Mohammad Ashraful, et al. "Modeling, Profiling, and Debugging the Energy Consumption of Mobile Devices". ACM Computing Surveys, vol. 0, No. 0. Oct. 2015. ACM. (Year: 2015).*

Di Nucci, Dario, et al. "Software-Based Energy Profiling of Android Apps: Simple, Efficient and Reliable?" 2017. IEEE. (Year: 2017).*

'Electronic device' in Vocabulary.com Dictionary. Online 2020. Retrieved from Internet Oct. 8, 2020. <https://www.vocabulary.com/dictionary/electronic%20device>. (Year: 2020).*

'Device' in Vocabulary.com Dictionary. Online 2020. Retrieved from Internet Oct. 8, 2020. <https://www.vocabulary.com/dictionary/device>. (Year: 2020).*

'Devices' in Vocabulary.com Dictionary. Online 2020. Retrieved from Internet Oct. 8, 2020. <https://www.vocabulary.com/dictionary/devices>. (Year: 2020).*

'Device' in Lexico.com Dictionary. Oxford University Press. Online 2020. Retrieved from Internet Oct. 8, 2020. <https://www.lexico.com/en/definition/device>. (Year: 2020).*

'Device' in "The American Heritage College Dictionary". Fourth Edition. 2002. Houghton Mifflin Company. p. 388. (Year: 2002).*

* cited by examiner

APPARATUS AND METHOD FOR MANAGING POWER CONSUMPTION IN ELECTRONIC DEVICE

CROSS-REFERENCE TO RELATED APPLICATION

This application is based on and claims priority under 35 U.S.C. § 119 to Korean Patent Application No. 10-2017-0163733 filed on Nov. 30, 2017 in the Korean Intellectual Property Office, the disclosure of which is incorporated by reference herein in its entirety.

BACKGROUND

1. Field

The present disclosure relates to an apparatus and a method for managing power consumption of each power consumption element in an electronic device.

2. Description of Related Art

Generally, a portable electronic device includes an internal chargeable battery. The capacity of the internal battery may be a key requirement for determining the use time of the electronic device. Accordingly, one of the methods for increasing the use time of electronic devices is increasing the capacity of the internal battery. However, there is a limit on increasing the capacity of the internal memory. For this reason, developing a method for efficiently managing power consumption of the electronic device is provided.

In general, an electronic device may be required to accurately manage or predict power consumption according to the operation of each power consumption element in the electronic device. The power consumption element may be an element (hereinafter, referred to as a "hardware component" or an "HW element") corresponding to hardware included in the electronic device or an application (hereinafter, referred to as a "software component" or an "SW element") corresponding to software installed on the electronic device. The application may be executed by a combination of at least one hardware component. Accordingly, power consumption by one software component may be determined by the sum of power consumption of respective hardware components involved in executing the corresponding application.

If an accurate power consumption of each of the power consumption elements including HW elements and SW elements can be managed or predicted, the electronic device may provide both a more accurate indication of how much battery power is used and an additional function corresponding to the battery over-consumption application. For example, the additional function corresponding to the battery over-consumption application may include a battery over-consumption application, a search and notification application, and a power saving function of a standby current consumption application.

SUMMARY

In general, in order to efficiently manage power consumption in an electronic device using an internal battery, it may be important to accurately estimate current consumption as well as actual hours of use by the user.

According to an embodiment of the present disclosure, it is possible to provide an apparatus and method for managing power consumption which estimate power consumption of each power consumption element in an electronic device by using an internal battery through a preset power profile.

According to an embodiment of the present disclosure, it is possible to provide an apparatus and method for managing power consumption, wherein the apparatus and method update a power profile for estimating power consumption of each power consumption element in an electronic device including an internal battery.

According to an embodiment of the present disclosure, it is possible to provide an apparatus and method for managing power consumption, wherein the apparatus and method monitor user context corresponding to the actual use environment, that is, monitor a particular situation or the use of a particular application in an electronic device or update a power profile on the basis of the monitored user context.

According to an embodiment of the present disclosure, it is possible to provide an apparatus and method for managing power consumption, wherein the apparatus and method update a power profile on the basis of power consumption measured for one hardware component or each of a plurality of hardware components due to the use of a particular application in an electronic device using an internal battery and power consumption estimated for each hardware component or each of a plurality of hardware components due to the use of the particular application.

In accordance with an aspect of the present disclosure, a method of updating a power profile by an electronic device supporting a plurality of applications is provided. The method includes: estimating current power consumption of a terminal on the basis of unit power consumption corresponding to each target hardware component set to a power profile; monitoring whether an update of the power profile is required; and when it is determined that the update of the power profile is required, updating the power profile corresponding to each of the target hardware components on the basis of consumption estimated according to each of the target hardware components and consumption measured according to each of the target hardware components, wherein the unit power consumption is power consumption by a target hardware element per unit time.

In accordance with another aspect of the present disclosure, an apparatus for updating a power profile is provided. The apparatus includes: an internal battery; hardware components comprising power consumption elements in an electronic device to execute a plurality of applications installed in the electronic device; and a processor configured to estimate the current power consumption of a terminal, based on unit power consumption corresponding to each target hardware components set in a power profile, to monitor whether an update of the power profile is needed, and when it is determined that the update of the power profile is needed, to update the power profile corresponding each of the target hardware components by consumption estimated in accordance with each of the target hardware components and consumption measured in accordance with each of the target hardware components, wherein the unit power consumption is power consumption by the target hardware component per unit time.

In accordance with another aspect of the present disclosure, a method of managing power consumption by an electronic device is provided. The method includes: when one target application is executed from among a plurality of applications, acquiring power consumption by at least one power consumption element used to execute the target application from among power consumption elements included in the electronic device; and updating a power profile according to execution of the target application on the basis of the acquired power consumption.

When the power consumption of the electronic device is managed on the basis of various embodiments of the present disclosure, it is possible to more accurately estimate the power consumption of each power consumption element according to an operation state of the electronic device. Further, a separate device (power monitor) and an additional task by the user may not be required for estimating the power consumption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
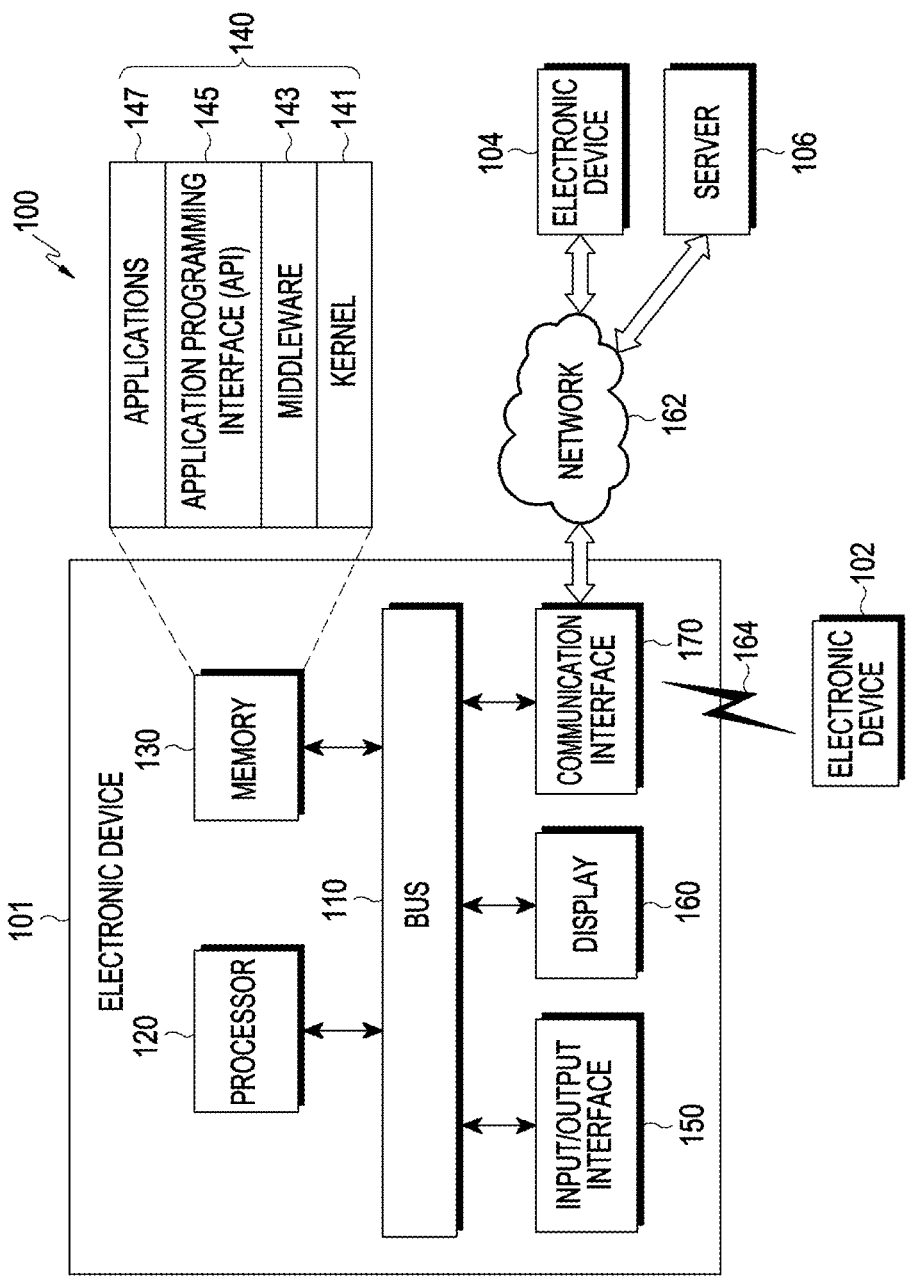
FIG. 1 illustrates a network environment including a wireless terminal according to various embodiments proposed by the present disclosure.

FIGS. 1 through 15C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to an embodiment may be a flexible electronic device. Further, the electronic device according to an embodiment of the present disclosure is not limited to the aforementioned devices, and may include a new electronic device according to the development of technology.

Various embodiments proposed by this document provide a method by which an electronic device estimates power consumption (hereinafter, referred to as a "power consumption estimation procedure") and measures power consumption (hereinafter, referred to as a "power consumption measurement procedure") and updates a target power profile (hereinafter, referred to as a "profile update procedure") in consideration of the estimated and measured power consumption. The target power profile may be a power profile to be applied to the estimation of power consumption. The target power profile may be, for example, one of an initial power profile and a power profile of which an update has been performed at least one time. The initial power profile may be, for example, a power profile installed when the electronic device is produced or a power profile installed due to initialization. The initialization may be restoring the power profile to the state at a particular time point (a production time point or a backup time point). The initialization may be divided into, for example, electronic device initialization, program initialization, and power profile initialization.

According to an embodiment, the electronic device may classify each application installed therein as one of a plurality of categories. The electronic device may determine a category into which an application is classified in consideration of one or a plurality of hardware components required to be driven to perform an operation according to the application (hereinafter, referred to as "driven hardware components"). This will be described by way of a detailed example.

Hereinafter, the electronic device according to various embodiments will be described with reference to the accompanying drawings. In this document, the term "user" may refer to a person using the electronic device or a device (for example, an artificial intelligence electronic device) using the electronic device.

FIG. 1 illustrates an electronic device 101 consumes predetermined power in each operation mode within a network environment 100 according to various embodiments proposed by the present disclosure. The electronic device 101 may include a bus 110, a processor 120, a memory 130, an input/output interface 150, a display 160, and a communication interface 170 as hardware components. According to some embodiments, the electronic device 101 may omit at least one the elements (hardware components) or further include other elements (hardware components). The further included hardware components may be, for example, a battery for supplying operational power and a power management module for managing power supplied from the battery.

Referring to FIG. 1, the bus 110 may include, for example, a circuit for connecting the elements 120 to 170 and transferring communication (for example, control message and/or data) between the elements 120 to 170.

The processor 120 may include one or more of a CPU, an Application Processor (AP), and a Communication Processor (CP). The processor 120 may carry out, for example, operations or data processing relating to the control and/or communication of at least one other element of the electronic device 101.

According to an embodiment, the processor 120 may classify each of applications 147 installed in the processor 120 as one of a plurality of categories. The processor 120 may determine, for example, a category which one application program is classified in consideration of one or a plurality of hardware components (hereinafter, referred to as "driven hardware components") required to be driven to perform an operation of the one application.

According to an embodiment, the processor 120 may determine a time interval for updating (or tuning) a power profile. The time interval for updating the power profile may be determined on the basis of a preset period or a preset condition. The processor 120 may monitor, for example, the use state of the electronic device and determine time points at which the power profile update starts and ends on the basis of the monitoring result. That is, the processor 120 may start the power profile update and perform the same for a predetermined time when a predetermined amount or more of database information according to power consumption estimated or measured according to each application is collected. Alternatively, the processor 120 may start the power profile update and perform the same for a predetermined time when the difference between power consumption measured by a particular application program or a particular hardware component (hereinafter, referred to as "measured power consumption") and power consumption estimated by a particular application program or a particular hardware component (hereinafter, referred to as "estimated power consumption") is larger than a preset error range.

According to an embodiment, the processor 120 may measure total current, voltage, or power consumption in the electronic device for a predetermined time according to each application and record the measured result in a predetermined database. For example, when one or a plurality of applications is executed, the processor 120 may measure current, voltage, or power consumption corresponding to each application and record the measured current, voltage, or power consumption in accordance with the corresponding application program. For example, when a particular application is used, the processor 120 may measure current, voltage, or power consumption in one hardware component or each of a plurality of driven hardware components according to the use of the particular application program for a predetermined time and may record the measured current, voltage, or power consumption in accordance with the corresponding driven hardware component in the corresponding application.

According to an embodiment, the processor 120 may calculate a current, voltage, or power consumption estimation using a preset power profile according to a current, voltage, power consumption model according to each hardware component or each of the combinations of hardware components. That is, the processor 120 may acquire, for example, estimated power consumption according to each of one or a plurality of driven hardware components according to each of the classified categories.

According to an embodiment, when a predetermined amount or more of database information according to each category, the processor 120 may compare estimated power consumption corresponding to each application or each hardware component with measured power consumption and update or tune the existing power profile on the basis of the comparison result. The processor 120 may adaptively determine the target of which consumption will be compared according to whether the consumption managed by the power profile is a current, a voltage, or power.

Meanwhile, the update or tuning of the power profile may be performed by an external device (a server) rather than the processor 120. Hereinafter, a detailed operation to be performed by the processor 120 according to various embodiments will be described in detail.

The memory 130 may include volatile and/or non-volatile memory. The memory 130, for example, may store commands or data related to at least one other element of the electronic device 101. According to an embodiment, the memory 130 may store software and/or a program 140. The program 140 may include, for example, a kernel 141, middleware 143, an Application Programming Interface (API) 145, and/or applications (or "apps") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing for one or more task requests by processing the one or more task requests according to a priority assigned to at least one application.

The API 145 is an interface through which the applications 147 control functions provided from the kernel 141 or the middleware 143, and may include, for example, at least one interface or function (for example, instruction) for file control, window control, image processing, or text control.

According to an embodiment, the memory 130 may include a table for classifying each of the applications 147 installed in the electronic device as one of a plurality of categories. For example, the table included in the memory 130 may mange, according to each category, one or a plurality of driven hardware components required to be driven to perform an operation according to one application.

According to an embodiment, the memory 130 may include a database for recording estimated and measured current, voltage, or power according to each category, each application, or each driven hardware component for a predetermined time. The memory 130 may include a database for recording estimated and measured current consumption, voltage consumption, or power consumption according to each category, each application, or each driven hardware component for a predetermined time.

According to an embodiment, the memory 130 may manage, through a power profile, one of or a plurality of parameters to estimate current, voltage, or power consumption according to each category, each application, or each driven hardware component. The power profile managed by the memory 130 may be the current, voltage, or power (unit consumption) consumed per unit time according to, for example, each hardware component. In this case, when the operation time of a particular hardware component is acquired, current, voltage, or power consumption in the particular hardware may be predicted using unit consumption managed by the power profile for the particular hardware component.

The input/output interface 150 may function as, for example, an interface that can forward instructions or data, which are input from a user or an external device, to the other element(s) of the electronic device 101. Furthermore, the input/output interface 150 may output the instructions or data received from the other component element(s) of the electronic device 101 to the user or another external device. For example, the input/output interface 150 may include a plurality of image sensors having different characteristics. The input/output interface 150 may transfer images captured by the plurality of image sensors to an image processing module (not shown), the memory 130, the display 160, and the communication interface 170 through the bus 110. The photographed images may have different image characteristics. This may be due to a difference in the image sensor characteristic or a condition set for the photographing.

According to an embodiment, the input/output interface 150 may provide information on estimated and measured current consumption, voltage consumption, and power consumption to an external device in order to update or tune the power profile. Further, the input/output interface 150 may receive a power profile to be used to estimate current consumption, voltage consumption, and power consumption from the external device and transfer the same to the processor 120 through the bus 110.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) to users. The display 160 may include a touch screen and may receive, for example, a touch, gesture, proximity, or hovering input using an electronic pen or the user's body part.

According to an embodiment, the display 160 may display information on the current, voltage, and power estimated and/or measured to be consumed according to each category, each application, each hardware component, or each hardware combination under the control of the processor 120.

The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

According to an embodiment, the communication interface 170 may provide information on estimated and measured current consumption, voltage consumption, or power consumption to the external device (the electronic device 102 or 104 or the server 106) in order to update or tune the power profile. Further, the communication interface 170 may receive a power profile to be used to estimate current consumption, voltage consumption, or power consumption from the external device and transfer the same to the processor 120 through the bus 110.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM) and the like, for example, as a cellular communication protocol. In addition, the wireless communication may include, for example, short range communication 164. The short-range communication 164 may include at least one of, for example, Wi-Fi, Bluetooth, Near Field Communication (NFC), Magnetic Stripe Transmission (MST), and Zigbee. The wireless communication may use, for example, a Global Positioning System (GPS) or a Global Navigation Satellite System (GNSS). The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (for example, a LAN or a WAN), the Internet, and a telephone network.

Each of the first and second external electronic devices 102 and 104 may be devices which are the same type as or different types from the electronic device 101. According to an embodiment, the server 106 may include a group of one or more servers. According to various embodiments, all or some of the operations executed by the electronic device 101 may be executed by another electronic device, a plurality of electronic devices (for example, the electronic devices 102 and 104, or the server 106). According to an embodiment, when the electronic device 101 should perform some functions or services automatically or according to a request, the electronic device 101 may make a request for at least some functions related to the functions or services to another device (for example, the electronic device 102 or 104 or the server 106) instead of executing the functions or services by itself. Another electronic device (for example, the electronic device 102 or 104 or the server 106) may execute requested functions or additional functions and transfer the result to the electronic device 101. The electronic device 101 may provide the requested functions or services according to the received result or by additionally processing the result. To this end, for example, cloud computing, distributed computing, or client-server computing technology may be used.

According to an embodiment, all elements (the bus 110, the processor 120, the memory 130, the input/output interface 150, the display 160, and the communication interface 170) included in the electronic device 101 may be power consumption elements. When the electronic device 101 performs a particular function or a particular operation, the power consumption elements may mean at least one element consuming power therefor.

For example, when the electronic device 101 performs an operation of processing internal data, only the processor 120 involved in processing the internal data may be the power consumption element (or current consumption element). In the following description, the power consumption element and the current consumption element will be used interchangeably. However, it should be noted that the two terms are used for the same purpose to express resource consumption with the only difference being (power or current) the terms for expressing resources supplied by the internal battery.

In another example, when the electronic device 101 reproduces a video through a network, the communication interface 170, the bus 110, the display 160, the processor 120, and the memory 130 involved in the reproduction of the video may be power consumption elements.

According to an embodiment, when at least one power consumption element according to the use of a particular situation or a particular application operates, the electronic device 101 may update a power profile corresponding to the particular situation or the use of the particular application.

For example, when the network is used through the communication interface 170 in the state in which the remaining charge of the internal battery is higher than or equal to 90% and the display 160 does not operate, the processor 120 may update information (network-related power profile) managed by the power profile in connection with at least one power consumption element (the communication interface 170, the processor 120, and the bus 110) related to the use of the network.

According to an embodiment, the electronic device 101 may update the power profile on the basis of a measured value and an estimated value of power consumption or current consumption corresponding to the particular situation or use of the particular application.

The measured value of the power consumption (or current consumption) may be acquired on the basis of consumption (for example, power consumption) for a predetermined time based on the recorded measured amount after periodically recording the measured amount (voltage, current, or power, hereinafter, referred to as "power" for convenience of description) for a predetermined time, for example, during the particular situation or while the particular application is in use.

The estimated value of power consumption may be acquired on the basis of collected information on the used amount and recorded information on the used amount after collecting the information on the used amount of each of at least one power consumption element or hardware component based on at least one power consumption element involved in the use of the particular situation or the particular application. The recorded information on the used amount may be acquired on the basis of information managed by the power profile corresponding to each of at least one power consumption element or the hardware components on the basis of at least one power consumption element.

The processor 120 may monitor the operational state of the electronic device 101 and determine a start time and an end time for the update of the power profile on the basis of the result thereof. A time interval at which the power profile is updated may be designated by the determined start time and the determined end time. The designated time interval may be used for controlling a time point at which the electronic device 101 updates the power profile corresponding to the particular situation or the use of the particular application is performed.

For example, the processor 120 may designate the time interval in which the power profile is updated according to each of the categories into which the application programs are classified. That is, the corresponding application program may be designated as a particular category group on the basis of at least one power consumption element required for executing each application. For example, category groups into which application programs are classified may be defined as [Table 1] below.

TABLE 1

| Group index (group #n) | Combination of power consumption elements |
|---|---|
| 1 | CPU |
| 2 | CPU, NET |
| 3 | CPU, SCR |

TABLE 1-continued

| Group index (group #n) | Combination of power consumption elements |
|---|---|
| 4 | CPU, SCR, GPU |
| 5 | CPU, NET, SCR |
| 6 | CPU, NET, SCR, GPU |

In [Table 1] above, the CPU may be the processor 120, the NET may be the communication interface 170, the SCR may be the display 160, and the Graphics Processing Unit (GPU), although not illustrated, may be an element for processing graphics. In [Table 1], it is noted that the CPU is used for executing most applications.

In [Table 1], the category group to which a particular application belongs may be designated by a power consumption element or a combination of power consumption elements involved in the operation according to executing the particular application.

The group index in [Table 1] may be an index assigned according to each of the categories in which applications are classified.

According to an embodiment, the memory 130 may include a database for managing power profiles, a data base (a category group DB) for managing time intervals in which power profiles are updated according to each category group, and a database (USAGE DB) for managing the measured value and estimated value of power consumption for the update of power profiles according to each category group.

Figure 2:
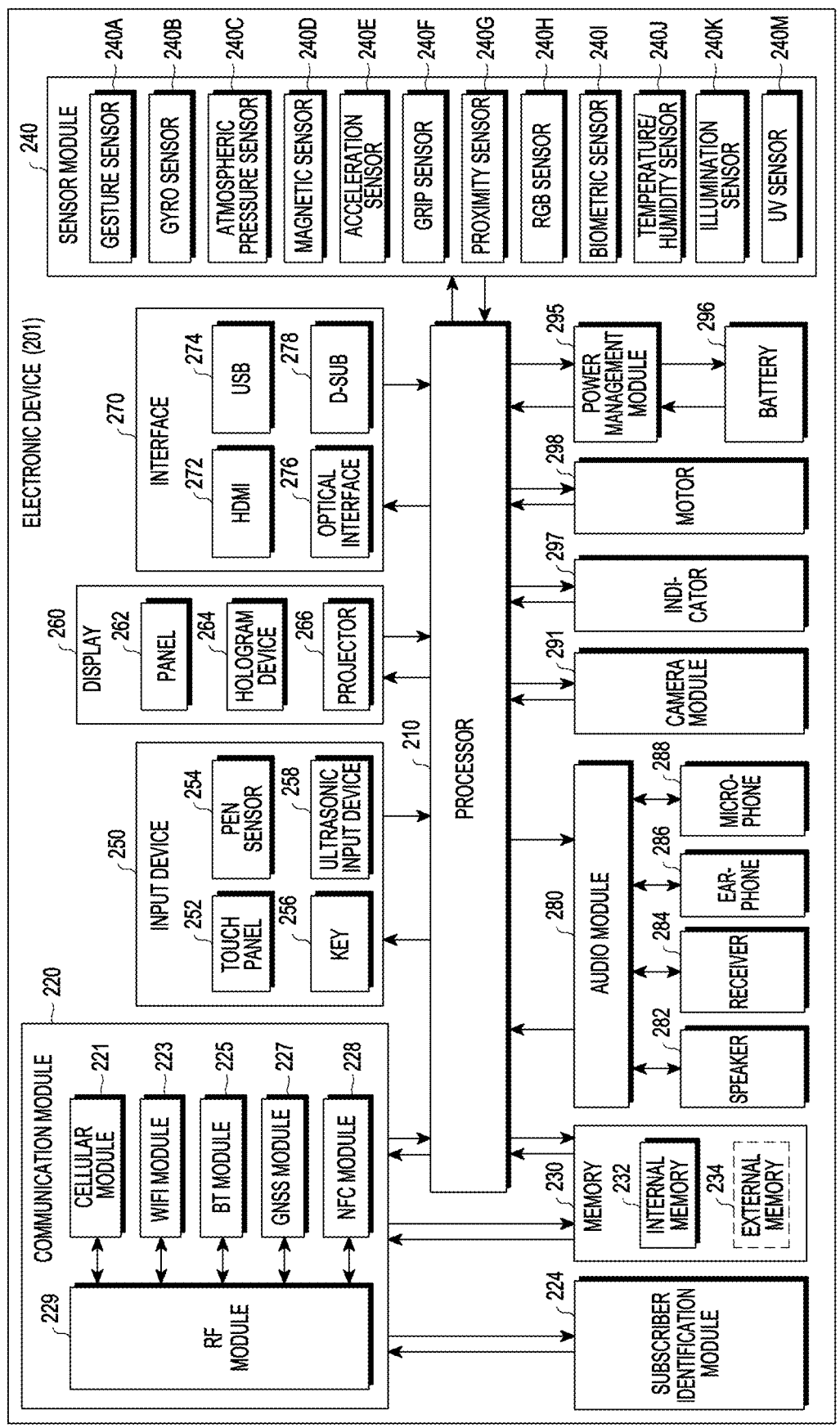
FIG. 2 is a block diagram illustrating a wireless terminal according to various embodiments proposed by the present disclosure.

FIG. 2 is a block diagram illustrating an electronic device 201 according to various embodiments proposed by the present disclosure.

Referring to FIG. 2, the electronic device 201 may include, for example, all or some of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some of the elements illustrated in FIG. 2 (for example, a cellular module 221). The processor 210 may load, in a volatile memory, instructions or data received from at least one of the other elements (for example, a non-volatile memory), process the loaded instructions or data, and store the result data in the non-volatile memory.

The communication module 220 may have a configuration identical or similar to that of the communication interface 170 illustrated in FIG. 1. The communication module 220 may include, for example, a cellular module 221, a Wi-Fi module 223, a Bluetooth module 225, a GPS module 227, an NFC module 228, and a Radio Frequency (RF) module 229.

The cellular module 221 may provide, for example, a voice call, a video call, a text message service, an Internet service, or the like through a communication network. According to an embodiment of the present disclosure, the cellular module 221 may identify or authenticate an electronic device 201 in the communication network using a subscriber identification module (for example, a SIM card) 224. According to an embodiment, the cellular module 221 may perform at least some of the functions that the processor 210 may provide. According to an embodiment, the cellular module 221 may include a CP.

Each of the Wi-Fi module 223, the BT module 225, the GPS module 227, and the NFC module 228 may include, for example, a processor for processing data transmitted/received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (for example, an RF signal). The RF module 229 may include, for example, a transceiver, a power amplifier module (PAM), a frequency filter, a low-noise amplifier (LNA), an antenna, or the like. According to another embodiment, at least one of the cellular module 221, the Wi-Fi module 223, the BT module 225, the GPS module 227, and the NFC module 228 may transmit/receive an RF signal through a separate RF module.

The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may measure, for example, a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210, in order to control the sensor module 240, while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 may include a panel 262, a hologram device 264, or a projector 266.

The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module.

According to an embodiment, the panel 262 may include at least one sensor. For example, the panel 262 may include a pressure sensor (or a force sensor (interchangeably used hereinafter)). The pressure sensor may be a sensor which can measure a strength of pressure of a user's touch. The pressure sensor and the touch panel 252 may be implemented in an integrated type or separately implemented as one or more sensors.

The hologram device 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like.

The camera module 291 is, for example, a device which may photograph a still image and a video. According to an embodiment of the present disclosure, the camera module 291 may include one or more image sensors (for example, a front sensor or a back sensor), a lens, an Image Signal Processor (ISP) or a flash (for example, LED or xenon lamp). That is, the camera module 291 may include a plurality of image sensors having different characteristics. The different characteristics are factors for determining characteristics of photographed images and may be characteristics for types of images (black and white or color), resolution, and view angle.

For example, the camera module 291 may be configured by a combination of image sensors that support different resolutions. That is, the combination of the image sensors included in the camera module 291 may include an image sensor having a high resolution (high definition) and an image sensor having a low resolution (low definition), include an image sensor for acquiring a black and white image and an image sensor for acquiring a color image, or include an image sensor having a wide view angle and an image sensor having a narrow view angle. Furthermore, the combination of the image sensors may be configured in consideration of a plurality of characteristics. That is, the combination may include a black and white (BW) image sensor for acquiring a black and white image having a relatively high resolution and a color image sensor for acquiring a color image having a relatively low resolution.

The camera module 291 may set different conditions for photography according to a plurality of respective image sensors. For example, the conditions for photography may include an exposure value, a shutter speed, an aperture value, white balance, and sensitivity. The plurality of images sensors may generate different resultant images according to the set photographing conditions.

The power management module 295 may manage, for example, the power of the electronic device 201. According to an embodiment, the power management module 295 may include a Power Management Integrated Circuit (PMIC), a charger Integrated Circuit (IC), or a battery 296 or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature while charging. The battery 296 may include, for example, a rechargeable battery and/or a solar battery.

According to an embodiment, when one target application from among a plurality of application is executed, the power management module 295 may estimate the power consumption of one power consumption element (hardware component) or a plurality of power consumption elements used for executing the target application from among the power consumption elements included in the electronic device 201. The power management module 295 may use a power profile in order to estimate the power consumption of the power consumption element. The power profile may define the power consumption of each hardware component per unit time (hereinafter, referred to as "unit power consumption") according to each application category. In this case, power consumption of a particular hardware component may be estimated by the total time during which the particular hardware component operates and unit power consumption of the particular hardware component. The total time corresponds to a time during which the particular hardware component operates while the target application is in use. The unit power consumption of the particular hardware component may be defined by the power consumption of the particular hardware component for a unit time (second). The unit power consumption of the particular hardware component may vary depending on the application category.

According to an embodiment, the power management module 295 may determine a time point at which the update of the power profile starts (update start time point) and a time point at which the update of the power profile ends (update end time) by monitoring the use of the electronic device. The power management module 295 may start the update of the power profile at the update start time point and end the update of the power profile at the update end time point.

When a particular application is used by the electronic device, the power management module 295 may measure, for example, total current consumption for a preset predetermined time and record the measured current (or voltage) consumption. That is, the power management module 295 may measure current (voltage or power) consumption according to each application used for a preset predetermined time and record the same as log information.

According to an embodiment, when a predetermined amount or more of data by the log information is collected according to each of the classified application categories, the power management module 295 may compare the current (voltage or power) consumption measured for each application category, each application, and each hardware combination or each hardware component with current (voltage or power) consumption measured therefor and update information managed by the power profile.

The operation of updating the power profile may be performed by a hardware component outside the electronic device rather than the hardware component (server) inside the electronic device.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing device (e.g., a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some elements of the electronic device according to various embodiments may be combined into one entity, which may perform functions identical to those of the corresponding elements before the combination.

Figure 3:
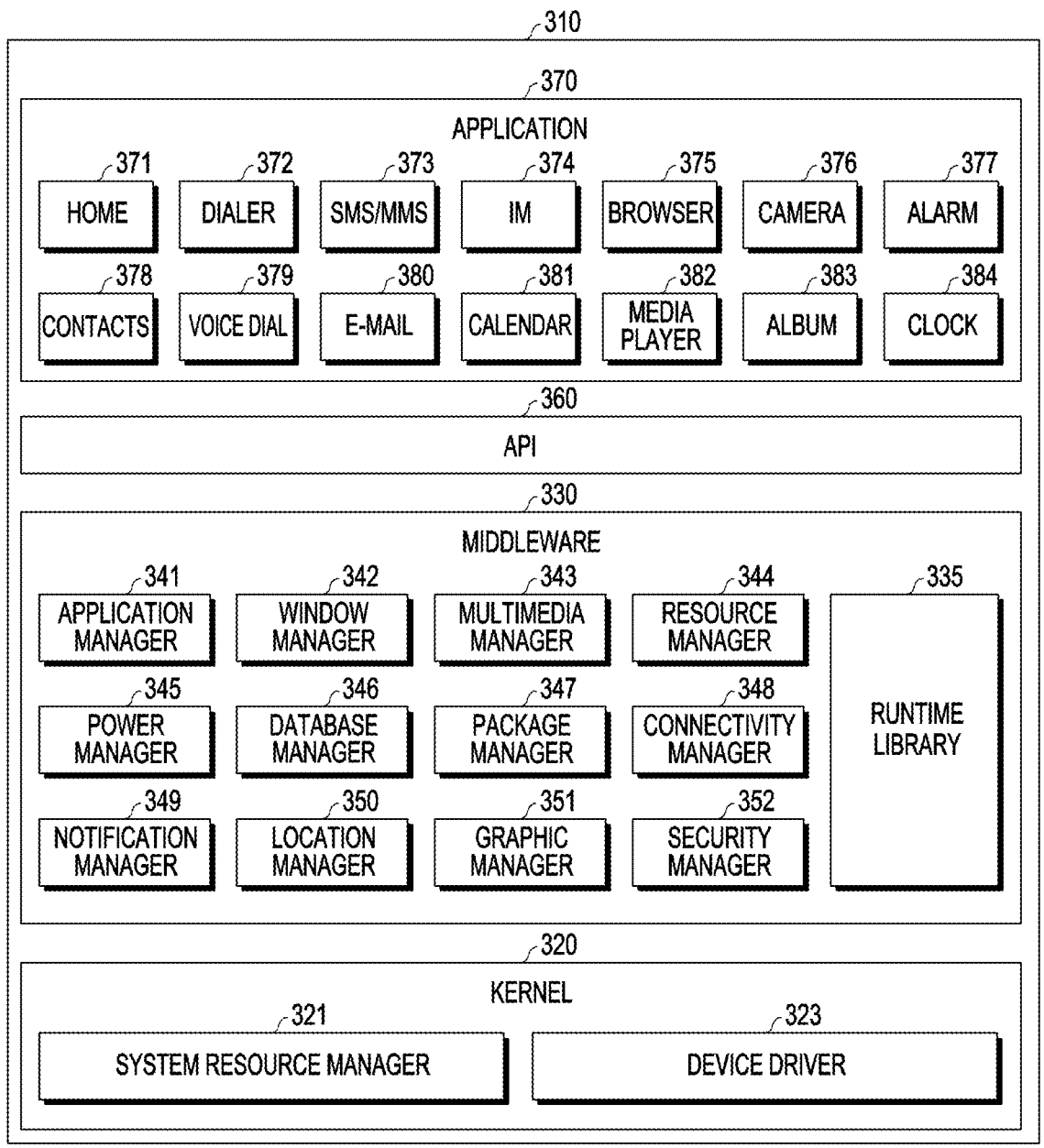
FIG. 3 is a block diagram illustrating a program module according to various embodiments proposed by the present disclosure.

FIG. 3 is a block diagram illustrating a program module according to various embodiments proposed by the present disclosure.

Referring to FIG. 3, a program module 310 (for example, the program 140) may include an Operating System (OS) for controlling resources related to the electronic device and/or various applications (for example, the applications 147) executed in the operating system. The operating system may be, for example, Android, iOS, Windows, Symbian, Tizen, Bada, and the like The program module 310 may include a kernel 320, middleware 330, an Application Programming Interface (API) 360, and/or applications 370. At least some of the program module 310 may be preloaded to the electronic device or may be downloaded from an external electronic device (for example, the electronic device 102 or 104 or the server 106).

The kernel 320, the middleware 330, the API 360, and the applications 370 included in the program module 310 may be, for example, the kernel 141, the middleware 143, the API 145, and the applications 147 included in the program 140 of FIG. 1.

The kernel 320 may include, for example, a system resource manager 321 and/or a device driver 323. The system resource manager 321 may control, allocate, or retrieve system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function required by the applications 370 in common or provide various functions as the applications 370 through the API 360 such that the applications 370 can efficiently use limited system resources within the electronic device. According to an embodiment, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like.

The application manager 341 may manage, for example, a life cycle of at least one application among the applications 370. The window manager 342 may manage Graphical User Interface (GUI) resources used on a screen. The multimedia manager 343 may identify formats required for reproducing various media files and may encode or decode a media file using a codec suitable for the corresponding format. The resources manager 344 may manage resources such as a source code, a memory, or a storage space of at least one of the applications 370.

The power manager 345 may operate together with, for example, a Basic Input/Output System (BIOS) to manage a battery or power, and may provide power information required for operating the electronic device. The database manager 346 may generate, search for, or change a database to be used by at least one of the applications 370. The package manager 347 may manage the installation or update of an application distributed in the form of a package file.

The connectivity manager 348 may manage a wireless connection, such as Wi-Fi, Bluetooth, and the like. The notification manager 349 may display or provide notification of an event, such as an arrival message, an appointment, a proximity notification, or the like, in such a manner as not to disturb a user. The location manager 350 may manage location information of the electronic device. The graphic manager 351 may manage a graphic effect to be provided to a user and a user interface relating to the graphic effect. The security manager 352 may provide various security functions for system security, user authentication, and the like. According to an embodiment, when the electronic device includes a phone function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 may include, for example, one or more applications that can perform functions, such as a home application 371, dialer application 372, an SMS/MMS application 373, an Instant Message (IM) application 374, a browser application 375, a camera application 376, an alarm application 377, a contact application 378, a voice dial application 379, an e-mail application 380, a calendar application 381, a media player application 382, an album application 383, and a clock application 384. The applications 370 may include an application for performing a function, such as a health care application (for example, measuring an exercise quantity or blood sugar) or an environment information providing application (for example, providing atmospheric pressure, humidity, or temperature information).

According to an embodiment, the applications 370 may include an application (hereinafter, referred to as an "information exchange application" for convenience of description) for supporting an exchange of information between the electronic device (for example, the electronic device 101) and an external electronic device. The information exchange application may include, for example, a notification relay application for delivering particular information to an external electronic device and a device management application for managing an external electronic device.

For example, the notification relay application may include a function for transmitting notification information generated by another application (for example, an SMS/MMS application, an email application, a health management application, or an environment information application) of the electronic device to an external electronic device. The notification relay application may receive, for example, notification information from an external electronic device and may provide the same to the user.

The device management application may manage (for example, install, delete, or update), for example, at least one function of an external electronic device communicating with the electronic device (for example, turning on/off the external electronic device itself (or some elements) or controlling brightness (or resolution) of the display), an application executed in the external electronic device, or a service (for example, a call service or a message service) provided by the external electronic device.

According to an embodiment, the applications 370 may include an application (for example, a health care application of a mobile medical device) designated according to attributes of an external electronic device. According to an embodiment, the applications 370 may include an application received from an external electronic device. According to an embodiment, the applications 370 may include a preloaded application or a third-party application that can be downloaded from a server. The names of the elements of the program module 310, according to the embodiment illustrated in the drawing, may vary according to the type of operating system.

According to various embodiments, at least a part of the programming module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The present disclosure proposes various embodiments for estimating power consumption according to each power consumption element in the electronic device. As defined above, the power consumption elements may include software components such as applications installed and executed in the electronic device as well as hardware components included in the electronic device.

According to an embodiment, the power consumption elements in the electronic device may include most of the hardware components illustrated in FIG. 2. That is, the hardware components included in the power consumption elements of the electronic device may be the processor 210, the communication module 220, the sensor module 240, the input device 250, the display 260, and the interface 270. The processor 210 may include one or a plurality of an AP, a CP, a CPU, and a GPU. The communication module 220 may include modules 221, 223, 225, 227, and 228 for supporting various communication schemes (cellular (LTE and 3G), Wi-Fi, BT, GNSS, and NFC) and the RF module 229.

According to an embodiment, the power consumption elements in the electronic device may include most of the software components illustrated in FIG. 3. That is, the software components included in the power consumption elements in the electronic device may be the kernel 320, the middleware 330, the API 360, and the applications 370. The applications 370 may include various applications according to respective functions.

According to an embodiment, the electronic device may include a hardware component and/or a software component (hereinafter, referred to as a "power estimator") for estimating power consumption for each power consumption element. For example, the operation proposed by the processor 210, the power management module 295, or a separate additional element included in the electronic device may be performed. In the following description, for convenience of description, a subject that performs the proposed operation may be referred to as a processor or an electronic device.

Figure 4:
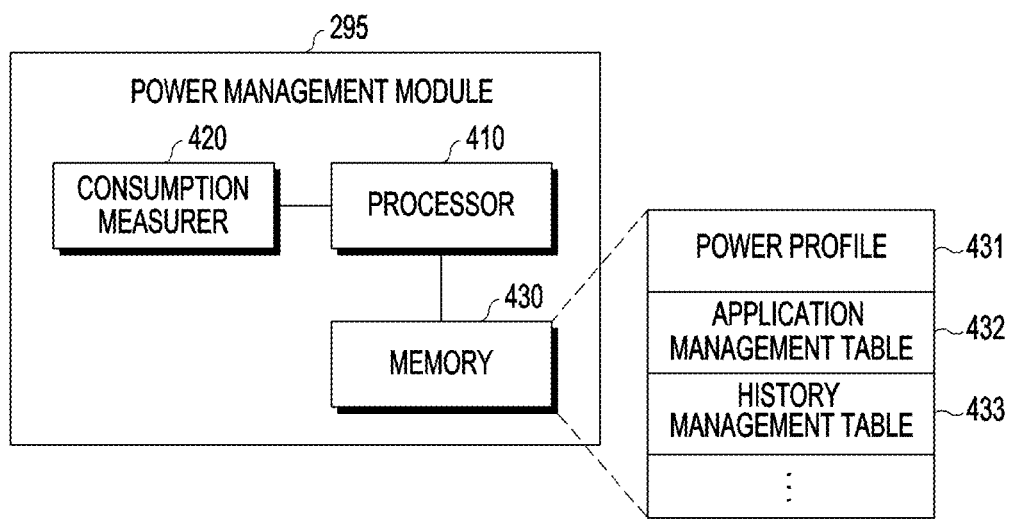
FIG. 4 illustrates the configuration of a power management module 295 included in an electronic device according to various embodiments proposed by the present disclosure.

FIG. 4 illustrates the configuration of the power management module 295 included in the electronic device according to various embodiments proposed by the present disclosure.

Referring to FIG. 4, the power management module 295 may include a processor 410, a consumption measurer 420, and a memory 430. The power management module 295 may perform a power consumption estimation operation, a power consumption measurement operation, and a power profile update operation. The power management module 295 may classify each of the applications into one of the categories divided according to a combination of driven hardware components.

The processor 410 may estimate power consumption according to each application or each application category in each use frequency during a predetermined time interval. The processor 410 may update a power profile in consideration of the estimated power consumption and the measured power consumption.

According to an embodiment, the processor 410 may set category groups according to each of at least one installed application. Setting the category group of the application may be performed on the basis of at least one power consumption element involved in executing the corresponding application. The set category group of the application may be recorded in an application management table 432 by the memory 430.

According to an embodiment, the processor 410 may install various types of applications. The applications may use different power consumption elements or combinations of power consumption elements (for example, HW components) according to the purpose thereof. Accordingly, in order to set the category group for each application, it is required to monitor which power consumption element or which combination of power consumption elements is used by each corresponding application whenever the corresponding application is used.

For example, the processor 410 may generally use the CPU for most applications. Accordingly, in the electronic device, the power consumption element or the combination of power consumption elements may necessarily include the CPU.

The processor 410 may log, in real time, the used amount of data of each application according to transmission/reception of data through a network. For example, the processor 410 may identify whether a used amount of data increases by monitoring the corresponding log according to the use of a particular application. Accordingly, the processor 410 may identify whether the network is used on the basis of whether the used amount of data increases while the application is in use.

Further, the processor 410 may identify whether a particular application uses the CPU through the same method as that of identifying whether the network is used. When a particular application is executed, the processor 410 may identify whether the particular application uses a display means (a screen) on the basis of whether the display means is turned on or off.

According to the method, the processor 410 may set one of the category groups shown in [Table 2] below in accordance with the corresponding application according to a power consumption element or a combination of power consumption elements used for each installed application.

TABLE 2

| First category group | {CPU-only} |
| Second category group | {CPU + NET} |
| Third category group | {CPU + SCR} |
| Fourth category group | {CPU + SCR + GPU} |
| Fifth category group | {CPU + NET + SCR} |
| Sixth category group | {CPU + NET + SCR + GPU} |

The category groups in [Table 2] above may be defined by one driven hardware component or a combination of a plurality of hardware components operating when the application is executed, and may be classified into categories.

On the basis of the category groups divided as shown in [Table 2] above, applications classified into respective category groups may be arranged as shown in [Table 3] below.

TABLE 3

| | |
|---|---|
| {CPU-only} | WakeLock acquisition, CPU loader app execution, SW installation/update (except for download time), and screen off state operation such as CPU benchmark app execution |
| {CPU + NET} | App generating background traffic in standby mode and file download/upload (photo synchronization) in screen-off state |
| {CPU + SCR} | Widget home, local app (memo, calculator, and schedule), and local radio |
| {CPU + SCR + GPU} | Games which do not use network among various games |
| {CPU + NET + SCR} | SNS app, file upload/download, and radio streaming |
| {CPU + NET + SCR + GPU} | Online games using network among various games, video streaming, and web browsing |

The processor 410 may generate an application database based on applications set for each category group. The generated application database may be recorded in the form of an application management table 432 in the memory 430. When the application database has been already generated, the processor 410 may add a particular application to the application database in consideration of a category group set for the particular application.

In order to set a time interval for updating a power profile by monitoring a user terminal state and a used application, the processor 410 may determine a start time point and an end time point of the power profile update (tuning). For example, when at least one condition of a time which the user explicitly inputs, the case in which battery consumption is predetermined level (for example, 90% or higher immediately after battery charging is released, the case in which a base station cell ID is changed, the case in which a previous network parameter update time passes a predetermined time in the current base station cell ID, and the case in which an application of the {CPU+NET} category is executed in a standby mode and a small amount of packets (Keep-alive message) are generated is satisfied, the inactivity time (tail time) of the corresponding network and voltage (current) logging for power tuning may be started.

For example, the consumption measurer 420 may measure a user terminal state and a used amount of the used application for a predetermined time (for example, 1 minute) whenever the CPU wakes up from a standby mode of the electronic device for a predetermined time, that is, a time interval (for example, 1 hour) for updating the power profile. When the screen is turned on, a base station cell ID is changed, or motion is detected for a predetermined time or longer, the consumption measurer 420 may end the measurement.

When a predetermined amount or more of data corresponding to each of the category groups is collected, the processor 410 may correct the parameter of the power consumption element or a combination of power consumption parameters corresponding to the corresponding category group.

For example, the processor 410 may predict a predetermined pattern (LTE connection state) on the basis of the measured voltage log.

In order to update the CPU power profile, when the {CPU-only} application is executed and an update context condition is met, for example, when remaining charger of the battery is 90% or more and an automatic update is executed in a screen-off state, voltage logging is started to calculate the actual power consumption $E_{vol}$ of the terminal and CPU use information for the CPU power estimation $E_{vol}$(CPU) is stored from a download end time to an installation completion time.

When a predetermined amount or more of corresponding data is collected, the processor 410 may calculate current consumption for each text on the basis of the stored CPU use information and the power profile value, compare the current consumption with the power log value, and correct the power profile value to minimize errors. At this time, the optical profile value {CPUprofile}* that minimizes errors may be acquired through Equation (1) below on the basis of a Minimum Mean Square Error (MMSE) scheme.

$$E_{vol}(CPU) = E_{est}(CPU) + \varepsilon_{CPU} \rightarrow \{CPUprofile\}^* = \arg\min_{\{CPUprofile\}} MSE(\varepsilon_{CPU}) \quad \text{Equation (1)}$$

In another example, when the update context is met and the corresponding application is executed through a similar method with respect to the category group {CPU+NET}, a voltage log and information of a used amount required for estimating current consumption of the CPU and the network are stored. When a predetermined amount or more of data is collected, the consumption measurer 420 may derive actual current consumption of {CPU+NET} from the voltage log and correct or update the power profile value corresponding to the network from Equation (2) below under the assumption that a value generated by subtracting CPU current consumption from the actual current consumption is network current consumption.

$$E_{vol}(CPU+NET) - E_{est}(CPU) = E_{est}(NET) + \varepsilon_{NET} \quad \text{Equation (2)}$$

Through a similar method, under the assumption from the corrected power profile that a value generated by subtracting power consumption measured for the corresponding power consumption element or the combination of power consumption elements from power consumption of the voltage log is the power consumption of the remaining power consumption element or the remaining combination of power consumption elements, the power profile corresponding to each power consumption element or each combination of power consumption elements may be corrected using Equations (3) to (5) below.

$$E_{vol}(CPU+Screen) - E_{est}(CPU) = E_{est}(Screen) + \varepsilon_{Scr} \quad \text{Equation (3)}$$

$$E_{vol}(CPU+Screen+GPU) - E_{est}(CPU) - E_{est}(Screen) = E_{est}(GPU) + \varepsilon_{GPU} \quad \text{Equation (4)}$$

$$E_{vol}(CPU+Screen+GPU) - E_{est}(CPU) - E_{est}(Screen) = E_{est}(GPU) \pm \varepsilon_{GPU} \quad \text{Equation (5)}$$

As described above, a category group correlation for correcting the power profile according to each power consumption element or each combination of power consumption elements stage by stage may be illustrated on the basis of a predetermined pattern.

The memory 430 has a database to estimate the power consumption of each application or each combination of applications, compare the estimated power consumption for each application or each combination of applications with the actually measured power consumption, and update the power profile. The memory 430 includes, for example, a power profile 431, an application management table 432, and a history management table 433.

Figure 5:
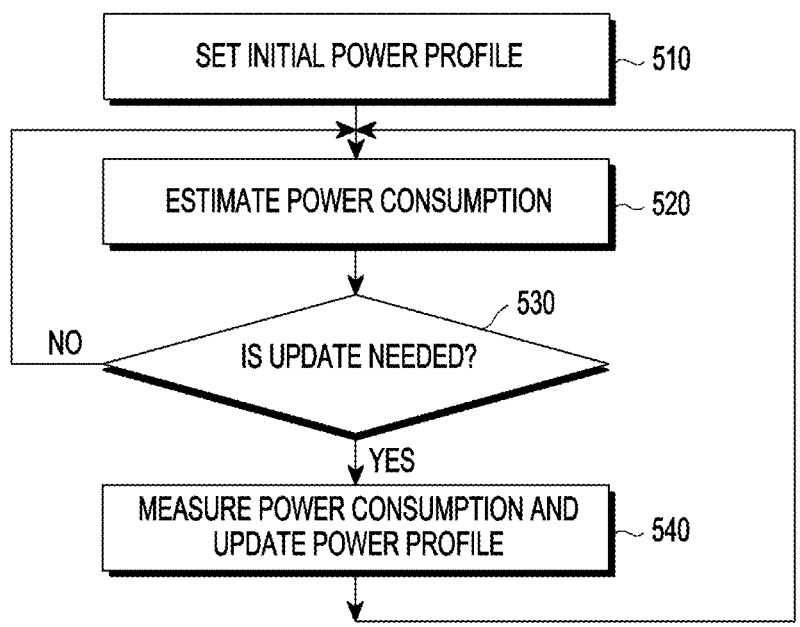
FIG. 5 is a flowchart illustrating an operation performed to manage power consumption by an electronic device according to various embodiments proposed by the present disclosure.

FIG. 5 is a flowchart illustrating an operation performed to manage power consumption by an electronic device according to various embodiments proposed by the present disclosure.

Referring to FIG. 5, the electronic device may set an initial power profile in step 510. The setting of the initial power profile may be performed during the process of producing the product. In this case, the electronic device which has been sold may omit step 510, as it does not need to set the initial power profile. The initial power profile may be prepared on the basis of one or a plurality of applications basically installed when the product is released. In this case, the electronic device may update the initial power profile on the basis of measured power consumption of combinations of driven hardware components involved in executing one or a plurality of applications newly installed. Furthermore, the power profile may be continuously updated or tuned on the basis of estimated and measured power consumption of the newly installed application.

According to an embodiment, the electronic device may classify each of the applications installed in the electronic device as one of a plurality of categories. In consideration of a combination of driven hardware components (one or a plurality of driven hardware components) required to be driven to perform the operation according to one application, the electronic device may determine a category which the one application is classified. An example thereof has been shown in [Table 1] to [Table 3] above.

The electronic device may estimate power consumption in step 520.

For example, through a profile, the electronic device may mange an active power value ($P_a(f_i)$) for each CPU frequency ($f_i$) and a base power value ($P_b(f_i)$) as parameters corresponding to the CPU. In this case, the electronic device may monitor a use rate ($r(f_i)$) for each CPU frequency for a predetermined time interval (t) and an active time ($t_a$) and estimate power consumption in the CPU by applying the result value ($r(f_i)$, $t_a$) and the parameters ($P_a(f_i)$, $P_b(f_i)$) managed by the profile to Equation (6).

$$P_{CPU}(t) = \Sigma_{(i=1)}^{K} r(f_i)\{P_a(f_i) \cdot t_a + P_b(f_i) \cdot t\} \quad \text{Equation (6)}$$

In this case, the accuracy of estimated power consumption may be determined according to the accuracy of the parameters managed by the power profile, that is, the active power value ($P_a(f_i)$) for each CPU frequency ($f_i$) and the base power value ($P_b(f_i)$) or the accuracy of power modeling.

In general, in the case of a preset electronic device, a power profile for defining a parameter fixed for each model or for each HW model in the production of a product may estimate current consumption for each model or each HW by the fixed parameter.

Meanwhile, power consumption may be generated due to power (hereinafter, referred to as tail power) to be used to maintain the active state of a network interface for a predetermined time (inactivity time (hereinafter, referred to as "tail time") after the electronic device transmits/receives data and before the electronic device switches to idle mode in the cellular network.

The tail time and the tail power generating current consumption may be changed according to a set value provided from the accessed network and/or base station. For example, when an amount of transmitted data is small, portions of current consumption, due to the tail time and the tail power, may be relatively large among total current consumption in the electronic device.

Accordingly, the tail time and the tail power may be considered when the electronic device estimates current consumption in the standby state (for example, the idle state). That is, it may be required to update, adjust, or correct the parameter for each application and/or current consumption element (a CPU, a network, a screen, and a GPU) by the power profile in consideration of the tail time and the tail power. In this case, reliability (or accuracy) of current consumption estimated for each network can be improved, and thus it is possible to prevent abnormal current consumption from being generated in the electronic device in the standby state.

Various embodiments proposed by the present disclosure propose various schemes in which the electronic device updates, adjusts, or corrects the parameter for each power consumption element (HW component or SW component) managed by the power profile. According to the proposal, the electronic device can more accurately estimate current consumption.

An embodiment may propose a scheme in which the electronic device models current consumption compared to a used amount for each power consumption element (HW component or SW component) generating battery current consumption (or power consumption or voltage consumption), manages the parameter of the corresponding power consumption element according to the modeling through the power profile, and estimates the current consumption of the electronic device on software on the basis of the managed power profile. That is, in the scheme for estimating the current consumption, when the electronic device uses an HW component, the current consumption by the corresponding HW component may be estimated using the parameter managed by the power profile in accordance with the corresponding HW component and a used amount of the corresponding HW component.

The electronic device determines whether updating the power profile is needed in step 530.

According to an embodiment, the electronic device may determine whether context when a particular application is used meets a power profile update (or correction) condition. The electronic device may monitor, for example, the user and context of the electronic device, determine a start time point and a stop time point at which the correction of the power profile is started and stopped, and determine that the context when the particular application is used meets the power profile update (or correction) condition at the determined start time point.

The electronic device may measure power consumption and update the power profile in step 540.

According to an embodiment, the electronic device may measure voltage (or current) consumption by a hardware component or a hardware combination as a particular application is used for a run time or a predetermined time. The electronic device may log the measured voltage (or current) value according to the particular application, the hardware component, or each of the hardware components corresponding to the hardware combination. The run time may be defined by the determined start time point and stop time point.

According to an embodiment, before determining whether the update of the power profile is needed, the electronic device may measure power consumption. The electronic device may measure total current, voltage, or power consumption for each application in the electronic device for a predetermined time and record the measured result in a predetermined database. When one application or a plurality of applications is executed, the electronic device may measure current, voltage, or power consumption corresponding to each application and record the measured current, voltage, or power consumption in accordance with the corresponding application.

When a particular application is used, the electronic device may measure current, voltage, or power consumption in one driven hardware component or each of a plurality of driven hardware components according to the use of the particular application for a predetermined time and record the measured current, voltage, or power consumption in accordance with the corresponding driven hardware component in the corresponding application.

The electronic device may compare power consumption measured for each hardware component or each hardware combination with power consumption estimated for each hardware component or each hardware combination and may update the power profile corresponding to the hardware component or the hardware combination on the basis of the comparison result. The electronic device may update, for example, the power profile according to each hardware component or each hardware combination stage by stage (for example, CPU→network→SCR→GPU or CPU-→SCR→GPU→network). The electronic device may update the power profile through a link with the used amount of each hardware combination.

According to an embodiment, the electronic device may update the parameter with the power profile determined by an outside factor (for example, a base station setting value). The electronic device may start tail detection when a small amount of data of an idle mode background application is generated (for example, when a message is received) in a particular situation (for example, a base station cell ID change, stop for a predetermined time, or a battery level higher than or equal to 80%). In this case, the electronic device may measure the voltage per second for a predetermined time (for example, 1 minute) immediately after data transmission/reception, estimate a tail time from a change pattern of a voltage value according to the voltage measurement, and update the profile on the basis of the estimated tail time. The electronic device may estimate a tail voltage from the change in the voltage value rather than the change pattern of the voltage value and update the profile on the basis of the estimated tail voltage.

For the power profile update according to the procedure, the electronic device may monitor the used amount by itself for a particular situation during a general run time without any connection with an additional external device or any additional task by the user. According to the proposed method, the electronic device may update the power profile by itself.

Furthermore, a hardware combination characteristic change of the electronic device, a dynamically varying hardware combination characteristic change, or a dynamically varying hardware combination state change (network environment change or an inactive timer) may be reflected in the run time to estimate the power consumption.

Figure 6:
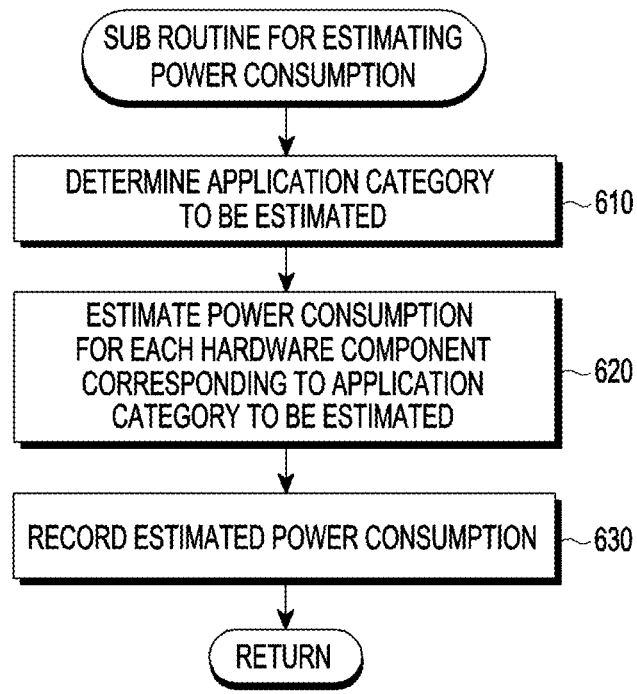
FIG. 6 illustrates a sub routine for estimating power consumption in the electronic device according to various embodiments proposed by the present disclosure.

FIG. 6 illustrates a sub routine for estimating power consumption in the electronic device according to various embodiments proposed by the present disclosure.

Referring to FIG. 6, the electronic device may determine an application category which an application to be estimated is classified in step 610. When executing the application to be estimated, the electronic device may identify at least one hardware component consuming power due to the execution of the application. The electronic device may identify the classified application category in accordance with the identified hardware component or a hardware combination.

The electronic device may estimate power consumption according to each hardware component or each hardware combination corresponding to the determined application category in step 620. The electronic device may estimate, for example, the power consumption of a CPU/GPU, the power consumption of a network, and the power consumption of a screen.

When estimating the power consumption of the CPU/GPU, the electronic device may estimate power consumption separately for an active time and an inactive time. The electronic device may estimate active power consumption and base power consumption in the active time on the basis of the use time of each application and the stay time rate of each frequency, and estimate power consumption in the corresponding frequency by the estimated active power consumption and base power consumption. In the inactive time, the electronic device may estimate power consumption on the basis of an idle (sleep) time, an awake (state 0) time log or idle power in an idle mode, or an awake power profile.

When estimating power consumption for the network, the electronic device may estimate power consumption by applying a power profile in an active mode on the basis of a performance-power relation prepared according to each network interface in a data generation time. When estimating power consumption for the network, the electronic device may apply power for the inactive mode for an inactive time according to each network interface in a data non-generation time and then apply power for the idle (sleep) mode.

When estimating power consumption for a screen, the electronic device may estimate power consumption by applying screen power according to the average color and brightness for a screen-on time.

Figure 9:
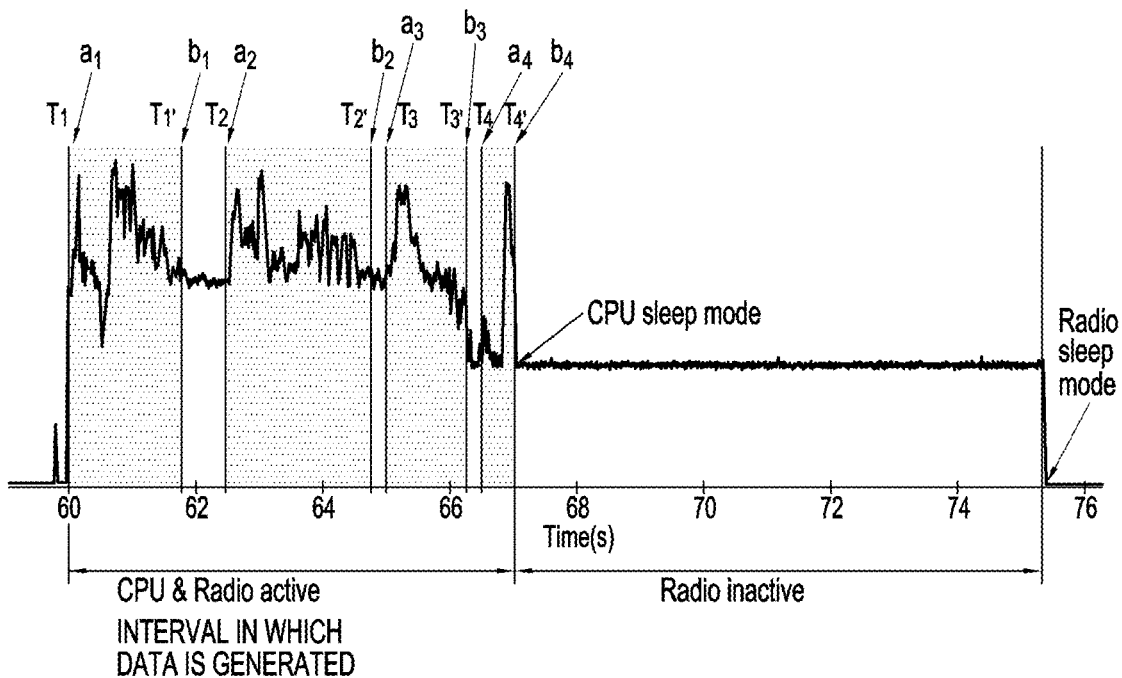
FIG. 9 illustrates an example in which the electronic device estimates power consumption of a network according to various embodiments proposed by the present disclosure.
Figure 10:
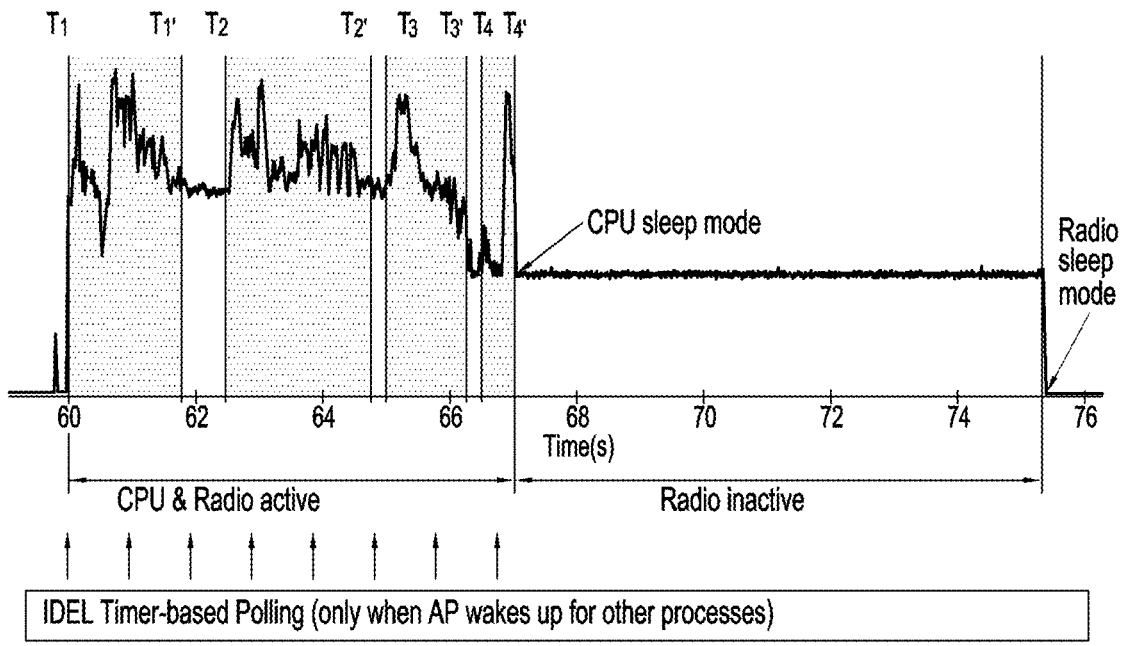
FIG. 10 illustrates another example in which the electronic device estimates power consumption of the network according to various embodiments proposed by the present disclosure.

The electronic device may identify whether the screen is in an on state or an off state and perform a differential power consumption estimation procedure according to the result thereof. Examples of estimating power consumption by the CPU and the network in the screen-on state and the screen-off state are illustrated in FIGS. 9 and 10, which will be described below in detail.

For the update of the power profile, the electronic device may separately record power consumption estimated for each hardware component corresponding to an application category to be estimated in step 630.

Figure 7:
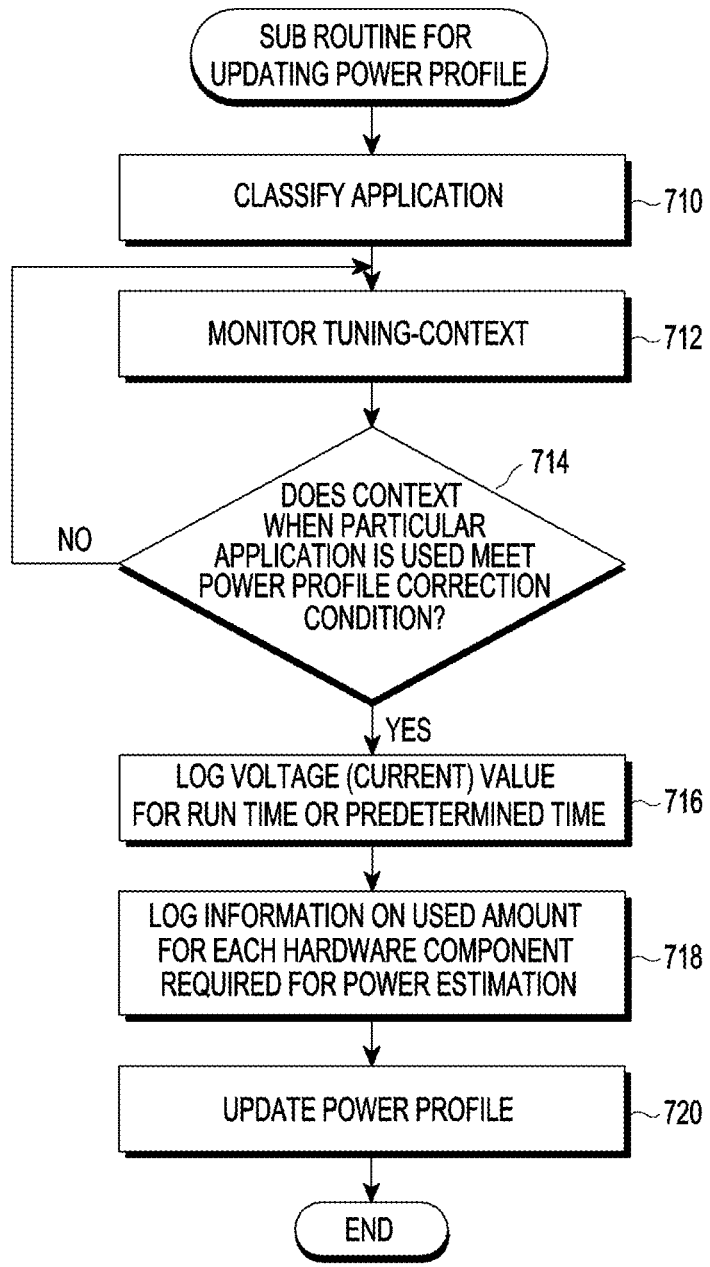
FIG. 7 illustrates a sub routine for updating a power profile in the electronic device according to various embodiments proposed by the present disclosure.

FIG. 7 illustrates a sub routine for updating the power profile in the electronic device according to various embodiments proposed by the present disclosure.

Referring to FIG. 7, the electronic device may classify each application as one of a plurality of application categories in step 710. To this end, the electronic device may monitor a used hardware component or combination of hardware components whenever an application is used.

When executing, for example, a particular application, the electronic device may determine an application category which the particular application is classified in consideration of one hardware component or a combination of hardware components that consume power. That is, applications required for updating the power profile may be classified according to each of the used hardware components.

According to an embodiment, the electronic device may classify applications according to each category (hereinafter, referred to as an "application category" or an "application group"). The application categories may be divided according to, for example, a hardware combination required for performing an operation according to the corresponding application.

[Table 4] below shows an example for classifying applications.

TABLE 4

| Application category | Hardware combination | Category example |
|---|---|---|
| APP CATEGORY #1 | CPU | Wake lock acquisition app, software installation/update (except for download), CPU benchmark app execution, and CPU loader app for CPU correction |
| APP CATEGORY #2 | CPU + NET | App generating background traffic in idle mode, and file download/upload (auto update and photo synchronization) in screen-off state |
| APP CATEGORY #3 | CPU + SCR | Widget home, local app (memo, calculation, and schedule), and local radio |
| APP CATEGORY #4 | CPU + SCR + GPU | Offline game |
| APP CATEGORY #5 | CPU + NET + SCR | SNS app, file upload/download, and radio streaming |
| APP CATEGORY #6 | CPU + NET + SCR + GPU | Online game, video streaming, and web browser |

In [Table 4] above, an application is classified as one of six categories by a used hardware combination. For example, an application using only a CPU may be classified as a first application category (APP CAREGORY #1), an application using a combination of a CPU and a network may be classified as a second application category (APP CAREGORY #2), and an application using a combination of a CPU and a screen (SCR) may be classified as a third application category (APP CAREGORY #3). An application using a combination of a CPU, an SCR, and a GPU may be classified as a fourth application category (APP CAREGORY #4), an application using a CPU, a NET, and an SCR may be classified as a fifth application category (APP CAREGORY #5), and an application using a combination of a CPU, a NET, an SCR, and a GPU may be classified as a sixth application category (APP CAREGORY #6).

The electronic device may monitor tuning-context in step 712. That is, the electronic device may determine a time point at which the update (or correction) of the power profile starts on the basis of a trigger for each hardware component or each hardware combination. For example, the electronic device may collect and store data for correcting the power profile (voltage or current, and use information required for estimation according to each hardware combination).

According to an embodiment, when an application included in a particular application category is executed and a tuning context matching of a hardware combination involved in the execution of the application is performed, the electronic device may start logging information for tuning (use information related to power estimation and voltage (or current) information for measuring power). Context consideration for each application may be, for example, battery status time, location, connection, and user settings. The battery status may be divided into non-charged, 90% or more for remaining charge of the battery, and 30 degrees or lower for battery temperature. The time indicates a time point at which tuning is performed and may be divided into periodic (for example, monthly), rebooting, night time (00:00~06:00), and non-used for a predetermined time. The location may be divided into Wi-Fi SSID, GPS-based, home, and office. The connection may be divided into Wi-Fi access, LTE access, LTE cell ID change, and Wi-Fi SSID change. The user settings may be a request for updating a user's profile.

The electronic device may determine whether context when a particular application is used meets a power profile update (or correction) condition in step 714. The electronic device may monitor, for example, the user and context of the electronic device, determine a start time point and a stop time point at which the correction of the power profile is started and stopped, and determine that the context when the particular application is used meets the power profile update (or correction) condition at the determined start time point.

When it is determined that the context when the particular application is used meets the power profile update (or correction) condition, the electronic device may measure a voltage (current) value consumed by a hardware component or a hardware combination according to the use of the particular application for a run time or a predetermined time in step 716 and log the measured voltage (or current) value according to each hardware component corresponding to the particular application, the hardware component, or each hardware element corresponding to the hardware combination. The run time may be defined by the determined start time point and stop time point.

The electronic device may log required information on the used amount for each hardware combination in step 718. The electronic device may estimate power consumption according to each hardware component included in the hardware combination on the basis of the logged information on the used amount for each hardware component and power consumption per unit time of each hardware component acquired from the power profile.

The electronic device may compare power consumption measured for each hardware component or each hardware combination with power consumption estimated for each hardware component or each hardware combination and may update the power profile corresponding to the hardware component or the hardware combination on the basis of the comparison result. The electronic device may update, for example, the power profile according to each hardware component or each hardware combination stage by stage (for example, CPU→network→SCR→GPU or CPU→SCR→GPU→network). The electronic device may update the power profile through a link with the used amount of data of each hardware combination.

According to an embodiment, the electronic device may update parameters within the power profile determined by outside factors (for example, base station setting values). The electronic device may start tail detection when a small amount of data of an idle mode background application is generated (for example, when a message is received) in a particular situation (for example, a base station cell ID change, stop for a predetermined time, or a battery level higher than or equal to 80%). In this case, the electronic device may measure the voltage per second for a predetermined time (for example, 1 minute) immediately after data transmission/reception, estimate a tail time from a change pattern of a voltage value according to the voltage measurement, and update the profile on the basis of the estimated tail time. The electronic device may estimate a tail voltage from the change in the voltage value rather than the change pattern of the voltage value and update the profile on the basis of the estimated tail voltage.

For the power profile update according to the procedure, the electronic device may monitor the used amount by itself for a particular situation during a general run time without any connection with an additional external device or any additional task by the user. According to the proposed method, the electronic device may update the power profile by itself.

Furthermore, a hardware combination characteristic change of the electronic device, a dynamically varying hardware combination characteristic change, or a dynamically varying hardware combination state change (network environment change or an inactive timer) may be reflected in the run time to estimate the power consumption.

Figure 8A:
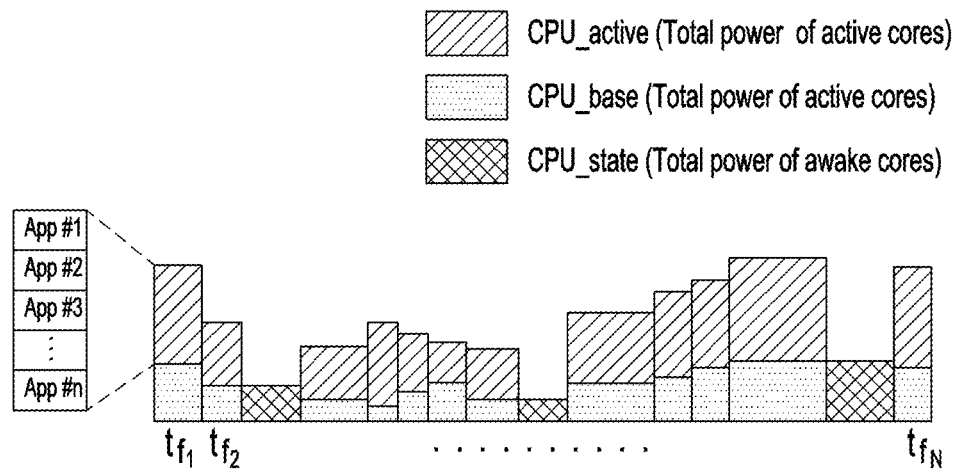
FIG. 8A illustrates an example of power consumption by a Central Processing Unit (CPU) in the electronic device according to various embodiments proposed by the present disclosure.

FIG. 8A illustrates an example of power consumption by the CPU in the electronic device according to various embodiments proposed by the present disclosure.

Referring to FIG. 8A, power consumption by the CPU may be divided into three types. That is, three types may include first type power consumption (CPU-active) generated by executing at least one application, second type power consumption (CPU_base) basically generated regardless of executing an application in an active state of the CPU, and third type power consumption (CPU_cstate) generated in a time interval before the CPU switches from an inactive state to a sleep mode.

The first type power consumption (CPU-active) may be estimated by the sum of power consumption by respective applications performed in CPU frequencies ($f_1, f_2, f_3 \ldots f_N$). The power consumption for each of the executed applications may be estimated using maintenance time ($t_{f1}, t_{f2}, t_{f3} \ldots t_{fN}$) of the CPU frequencies and power consumption per unit time of the application. In this case, the first type power consumption (CPU-active) in each of the CPU frequencies ($f_1, f_2, f_3 \ldots f_N$) may be estimated by the sum of power consumption estimated according to each application executed using the corresponding CPU frequency.

The application executed in each of the CPU frequencies ($f_1, f_2, f_3 \ldots f_N$) and a run time of the application may be acquired from log information.

The second type power consumption (CPU_base) may be estimated using power consumption per unit time basically generated in an active CPU interval including an execution interval of the application in each of the CPU frequencies ($f_1, f_2, f_3 \ldots f_N$) and the maintenance time ($t_{f1}, t_{f2}, t_{f3} \ldots t_{fN}$) of the CPU frequencies.

When the first power consumption is estimated for each of the executed applications, the second type power consumption for each application may be estimated in the active CPU interval on the basis of the ratio of a run time of each application acquired by the estimation result.

The third type power consumption may be estimated by acquiring power consumption per unit time in an inactive CUP state (C-state) from the power profile and acquiring a time during which the inactive state is maintained from log information.

Figure 8B:
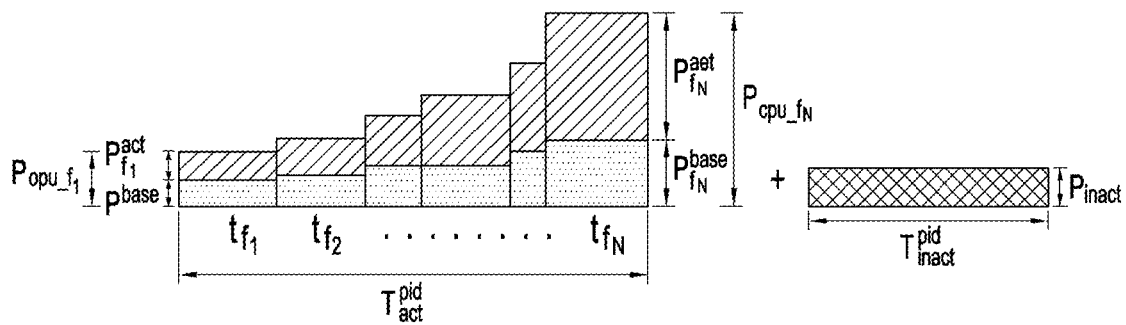
FIG. 8B illustrates an example in which the electronic device estimates power consumption of the CPU according to various embodiments proposed by the present disclosure.

FIG. 8B illustrates an example in which the electronic device estimates power consumption of the CPU according to various embodiments proposed by the present disclosure.

Referring to FIG. 8B, power consumption $P_{total}$ in a predetermined interval $T^{pid}_{act}+T^{pid}_{inact}$ may be estimated by the total sum of CPU activation power consumption $P_{CPU}$ and CPU inactivation power consumption $P_{inact}$ in each time interval ($t_{f1}, t_{f2}, t_{f3} \ldots t_{fN}$).

The CPU activation power consumption $P_{CPU}$ may be estimated by the sum of first power consumption $P^{act}$ for data transmission/reception estimated in each time interval in which data is transmitted/received and second power consumption $P^{base}$ basically generated regardless of data transmission/reception.

For example, power consumption $P_{(CPU-f1)}$ in the time interval $t_{f1}$ may be acquired by the sum of power consumption $P^{act}_{f1}$ for data transmission/reception estimated in the time interval $t_{f1}$ and power consumption $P^{base}_{f1}$ basically generated regardless of data transmission/reception.

In another example, power consumption $P_{(CPU-fN)}$ in the time interval $t_{fN}$ may be acquired by the sum of power consumption $P^{act}_{fN}$ for data transmission/reception estimated in the time interval $t_{fN}$ and power consumption $P^{base}_{fN}$ basically generated regardless of data transmission/reception.

The first power consumption $P^{act}$ may be estimated by acquiring power consumption per unit time for data transmission/reception from the power profile and multiplying the acquired power consumption per unit time and the time interval $t_f$.

The second power consumption $P^{base}$ may be estimated by acquiring power consumption per unit time generated in the inactive CPU state regardless of data transmission/reception from the power profile and multiplying the acquired power consumption per unit time and the time interval $t_f$.

Meanwhile, the CPU inactivation power consumption $P_{inact}$ may be estimated by acquiring power consumption per unit time generated in the inactive CPU state and multiplying the acquired power consumption per unit time and the entire time intervals $T^{pid}_{inact}$ in which the CPU is inactive.

FIG. 9 illustrates an example in which the electronic device estimates power consumption of the network according to various embodiments proposed by the present disclosure. In FIG. 9, a state in which a screen is turned on (active state) is assumed.

Referring to FIG. 9, when the screen is activated, the electronic device may acquire a time interval in which data transmission/reception exists and a time interval in which no data transmission/reception exists within a data generation interval (CPU and radio activation interval) on the basis of a data start notification and a data stop notification. In the data generation interval, a situation in which the CPU and the radio are activated is assumed. However, a change in power consumption according to the activation of the radio may be similar to that illustrated in FIG. 9 even though the activation of the CPU is not considered.

For example, time intervals ($T_1$-$T_1'$, $T_2$-$T_2'$, $T_3$-$T_3'$, and $T_4$-$T_4'$) between data start notification time points ($a_1, a_2, a_3$, and $a_4$ or $T_1, T_2, T_3$, and $T_4$) and data stop notification time points ($b_1, b_2, b_3$, and $b_4$ or $T_1', T_2', T_3'$, and $T_4'$) may be acquired as time intervals in which data transmission/reception exists. The time intervals ($T_1$-$T_1'$, $T_2$-$T_2'$, $T_3$-$T_3'$, and $T_4$-$T_4'$) between data start notification time points ($a_1, a_2, a_3$, and $a_4$ or $T_1, T_2, T_3$, and $T_4$) and data stop notification time points ($b_1, b_2, b_3$, and $b_4$ or $T_1', T_2', T_3'$, and $T_4'$) may be acquired as time intervals in which no data transmission/reception exists.

The electronic device acquires power consumption per unit time in data transmission/reception from the power profile and estimates power consumption in the time interval in which transmission/reception of each piece of data exists on the basis of the acquired power consumption per unit time. Total power consumption generated by data transmission/reception may be estimated by summing the power consumption estimated in the time intervals in which data transmission/reception exists.

Further, if the electronic device can acquire a used time of each application in the time interval in which data transmission/reception exists from the log information, the electronic device may estimate power consumption for each application in the time interval in which data transmission/reception exists.

If the electronic device estimates power consumption for each application in the time interval in which data transmission/reception exists, the electronic device may also estimate power consumption for each application in the time interval (radio tail interval) in which no data transmission/reception exists on the basis of the ratio of power consumption for each application acquired by the estimation result.

When the screen is activated, the electronic device may acquire a radio inactivation interval from an interval between the data stop notification time point and the next data start notification time point or an interval between the last data stop notification time point and a time point at which the network device is turned off and switches to a radio sleep mode.

The electronic device may acquire power consumption per unit time in the radio inactivation interval from the power profile and estimate power consumption in the radio inactivation interval on the basis of the acquired power consumption per unit time.

If the electronic device estimates power consumption for each application in the time interval in which data transmission/reception exists, the electronic device may estimate power consumption for each application in the radio inactivation interval on the basis of the ratio of power consumption for each application acquired by the estimation result.

As described above, the electronic device can estimate power consumption for each application in a predetermined interval in the state in which the screen is activated by the power consumption estimated for each application in the time interval in which data transmission/reception exists, the power consumption estimated for each application in the time interval in which no data transmission/reception exists, and the power consumption estimated for each application in the radio inactivation interval.

FIG. 10 illustrates another example in which the electronic device estimates the power consumption of the network according to various embodiments proposed by the present disclosure. In FIG. 10, a state (idle state) in which the screen is turned off is assumed.

Referring to FIG. 10, when the screen is inactivated, the data start notification and the data stop notification do not exist. In this case, the electronic device may register a timer for polling at a time point at which the CPU wakes up. The electronic device may check a used amount of data in every poll by the registered timer and estimate power consumption in the radio activation interval whenever a change in the used amount of data is made. For example, the electronic device may consider a time interval between the polling time point at which the previous change in the used amount of data is made and the polling time point at which this change in the used amount of data is made as the time interval in which data transmission/reception exists.

In this case, the electronic device may acquire power consumption per unit time in data transmission/reception from the power profile and estimate power consumption in the time interval in which corresponding data transmission/reception exists on the basis of the acquired power consumption per unit time. The electronic device may estimate power consumption in the time interval in which driving the polling timer is maintained, that is, in the data generation time interval by summing power consumption estimated at the time point at which the change in the used amount of data is made.

Further, if the electronic device can acquire a used time of each application in the time interval in which data transmission/reception exists from the log information, the electronic device may estimate power consumption for each application in the time interval in which data transmission/reception exists.

If the electronic device estimates power consumption for each application in the time interval in which data transmission/reception exists, the electronic device may also estimate power consumption for each application in the time interval (radio tail interval) in which no data transmission/reception exists on the basis of the ratio of power consumption for each application acquired by the estimation result.

When the screen is deactivated, driving the polling timer is stopped when the CPU switches to the sleep mode. Stopping the driving of the polling timer means that polling does not exist anymore.

Accordingly, the electronic device may estimate power consumption according to radio tail in a time interval (radio inactivation interval) between the time point at which the last polling is recognized when the CPU starts waking up (when the CPU is activated) and the time point at which the CPU woke up. That is, the electronic device may acquire power consumption per unit time in the radio inactivation interval from the power profile and estimate power consumption in the radio inactivation interval on the basis of the acquired power consumption per unit time.

If the electronic device estimates power consumption for each application in the time interval in which data transmission/reception exists, the electronic device may estimate power consumption for each application in the radio inactivation interval on the basis of the ratio of power consumption for each application acquired by the estimation result.

As described above, the electronic device can estimate power consumption for each application in a predetermined interval in the state in which the screen is activated by the power consumption estimated for each application in the time interval in which data transmission/reception exists, the power consumption estimated for each application in the time interval in which no data transmission/reception exists, and the power consumption estimated for each application in the radio inactivation interval.

Figure 11A:
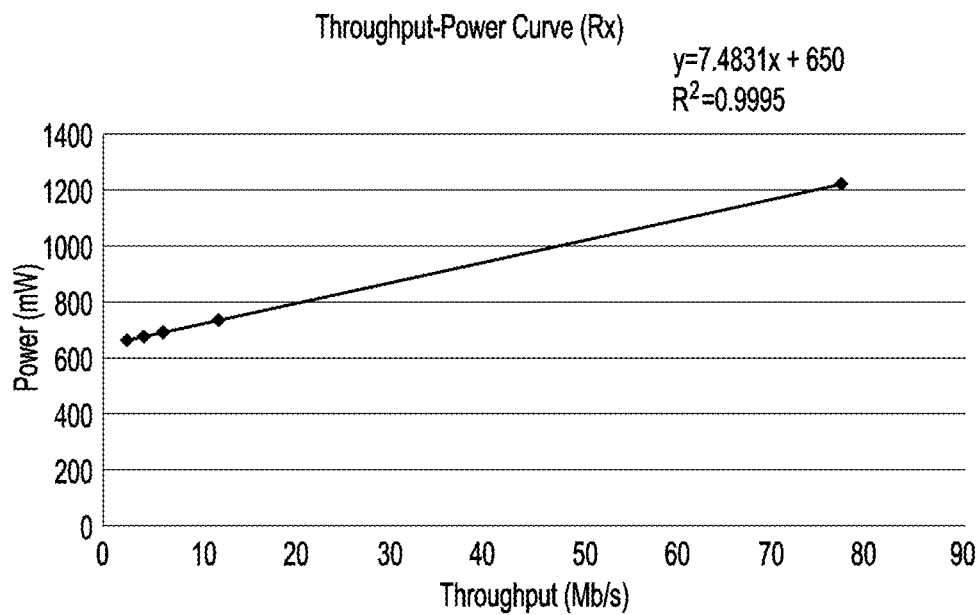
FIG. 11A illustrates an example in which the electronic device models power consumption corresponding to a reception speed of the LTE network according to various embodiments proposed by the present disclosure.

FIG. 11A illustrates an example in which the electronic device models power consumption corresponding to the reception speed of the LTE network according to various embodiments proposed by the present disclosure. In FIG. 11A, it is assumed that a communication scheme is LTE.

Referring to FIG. 11A, the electronic device may estimate power consumption in proportion to a change (increase or decrease) in throughput corresponding to an amount of received data (Mb/s) per unit time (second) in the LTE network. This may be defined by the power profile.

The electronic device may acquire power consumption generated per unit time (second) by measuring or identifying the speed (Mb/s) according to current reception. The electronic device may estimate total power consumption while the reception speed measured or identified using the power consumption per unit time is maintained.

The power consumption changing in proportion to the reception speed may be set in the form of a power consumption table including reception power consumption per unit time according to the LTE scheme in the power profile. In this case, when estimating power consumption according to data reception, the electronic device may acquire power consumption per unit time from a table set in the power table.

Figure 11B:
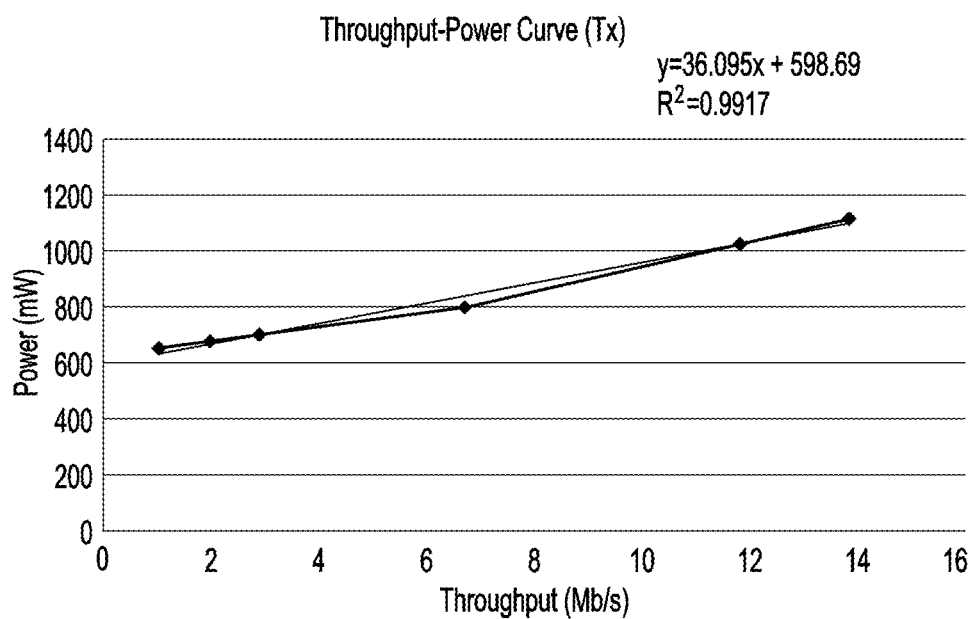
FIG. 11B illustrates an example in which the electronic device models power consumption corresponding to a transmission speed of the LTE network according to various embodiments proposed by the present disclosure.

FIG. 11B illustrates an example in which the electronic device models power consumption corresponding to the transmission speed of the LTE network according to various embodiments proposed by the present disclosure. In FIG. 11B, it is assumed that the communication scheme is LTE.

Referring to FIG. 11B, the electronic device may estimate power consumption in proportion to a change (increase or decrease) in throughput corresponding to an amount of transmitted data (Mb/s) per unit time (second) in the LTE network. This may be defined by the power profile.

The electronic device may acquire power consumption per unit time (second) by measuring or identifying the transmission speed (Mb/s) according to current transmission. The electronic device may estimate total power consumption while the transmission speed measured or identified using the power consumption per unit time is maintained.

The power consumption changing in proportion to the transmission speed may be set in the form of a power consumption table including transmission power consumption per unit time according to the LTE scheme in the power profile. In this case, when estimating the power consumption according to data transmission, the electronic device may acquire power consumption per unit time from a table set in the power table.

Figure 12A:
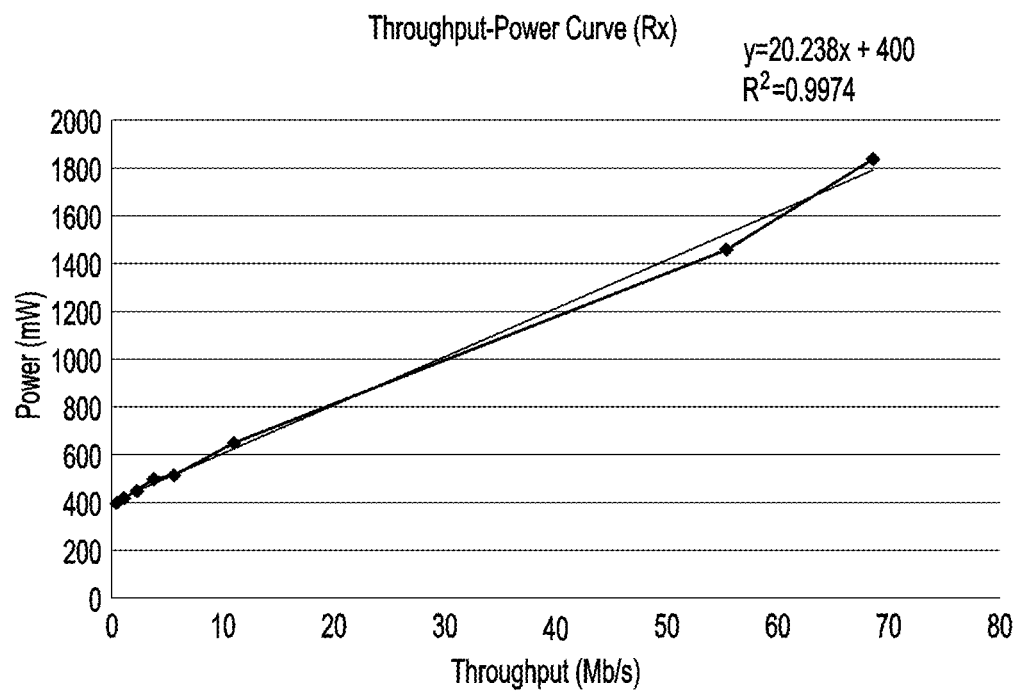
FIG. 12A illustrates another example in which the electronic device models power consumption corresponding to a reception speed of the Wi-Fi network according to various embodiments proposed by the present disclosure.

FIG. 12A illustrates another example in which the electronic device models power consumption corresponding to the reception speed of the Wi-Fi network according to various embodiments proposed by the present disclosure. In FIG. 12A, it is assumed that the communication scheme is Wi-Fi.

Referring to FIG. 12A, the electronic device may estimate power consumption in proportion to a change (increase or decrease) in throughput corresponding to an amount of received data (Mb/s) per unit time (second) in the Wi-Fi network. This may be defined by the power profile.

The electronic device may acquire power consumption generated per unit time (second) by measuring or identifying the current speed (Mb/s) according to reception. The electronic device may estimate total power consumption while the reception speed measured or identified using the power consumption per unit time is maintained.

The power consumption changing in proportion to the reception speed may be set in the form of a power consumption table including reception power consumption per unit time according to the Wi-Fi scheme in the power profile. In this case, when estimating power consumption according to data reception, the electronic device may acquire power consumption per unit time from a table set in the power table.

Figure 12B:
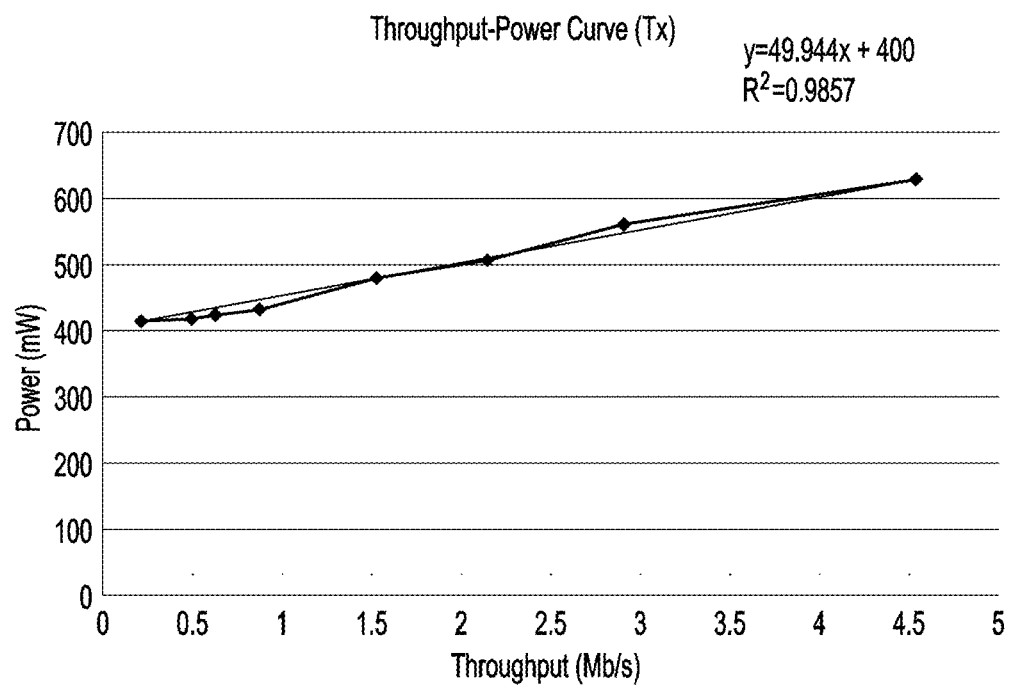
FIG. 12B illustrates another example in which the electronic device models power consumption corresponding to a reception transmission speed of the Wi-Fi network according to various embodiments proposed by the present disclosure.

FIG. 12B illustrates another example in which the electronic device models power consumption corresponding to the reception transmission speed of the Wi-Fi network according to various embodiments proposed by the present disclosure. In FIG. 12B, it is assumed that the communication scheme is Wi-Fi.

Referring to FIG. 12B, the electronic device may estimate power consumption in proportion to a change (increase or decrease) in throughput corresponding to an amount of transmitted data (Mb/s) per unit time (second) in the Wi-Fi network. This may be defined by the power profile.

The electronic device may acquire power consumption per unit time (second) by measuring or identifying the transmission speed (Mb/s) according to current transmission. The electronic device may estimate total power consumption while the transmission speed measured or identified using the power consumption per unit time is maintained.

The power consumption changing in proportion to the transmission speed may be set in the form of a power consumption table including transmission power consumption per unit time according to the Wi-Fi scheme in the power profile. In this case, when estimating the power consumption according to data transmission, the electronic device may acquire power consumption per unit time from a table set in the power table.

Figure 13:
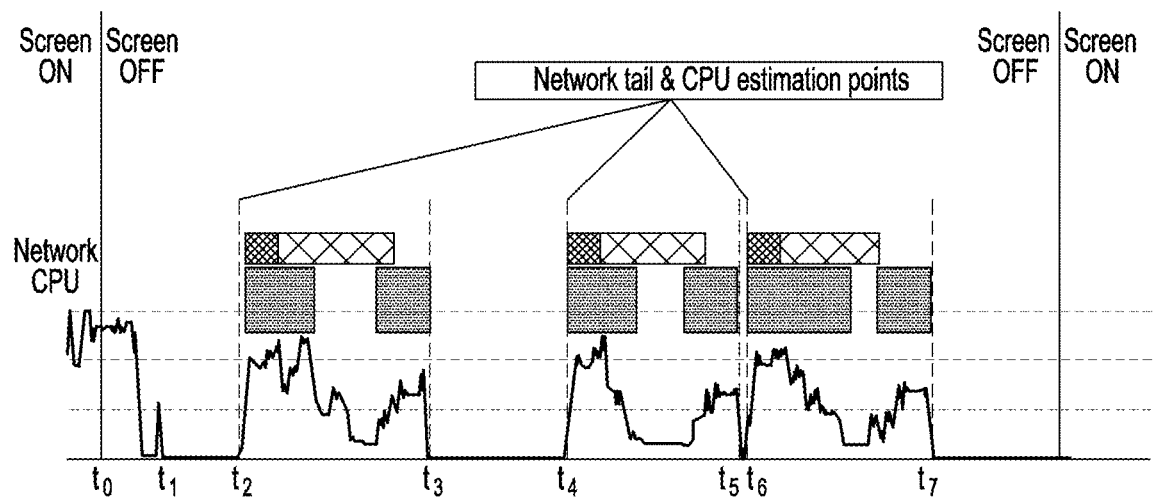
FIG. 13 illustrates an example in which the electronic device measures power consumption of the CPU and the network according to various embodiments proposed by the present disclosure.

FIG. 13 illustrates an example in which the electronic device measures the power consumption of the CPU and the network according to various embodiments proposed by the present disclosure.

Referring to FIG. 13, the electronic device may calculate current consumption (CPU current consumption and current consumption in a radio inactivation interval) in a wakeup burst interval preceding a time point at which the CPU wakes up. At this time, it is assumed that the screen is turned off.

For example, the electronic device may register a polling timer at a time point $t_0$ at which the screen is turned off. The electronic device may temporarily stop the polling timer at a time point $t_1$ at which the operation mode of the CPU switches to the sleep mode after registering the polling timer.

The electronic device may restart idle timer polling at each time point $t_2$, $t_4$, or $t_6$ at which the CPU wakes up until the screen is turned on. The electronic device may recognize a first polling time point after the restart of the idle timer polling as a time point at which power consumption is measured in the network tail and the CPU. That is, the electronic device may calculate CPU current consumption in the wakeup burst interval immediately before the first polling time point after the restart of the idle timer polling and current consumption in the radio inactivation interval.

Figure 14:
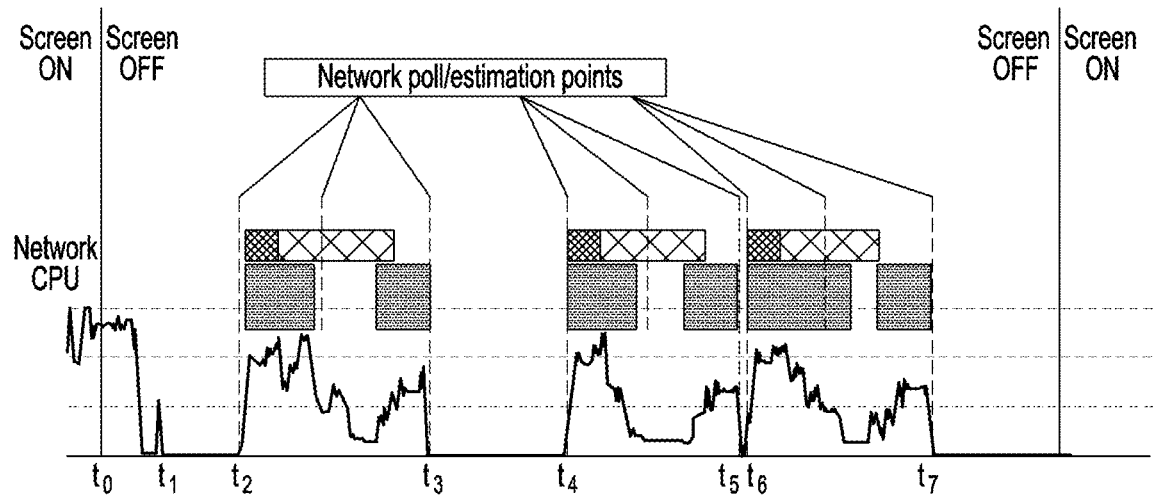
FIG. 14 illustrates an example in which the electronic device measures power consumption of the CPU and the network according to various embodiments proposed by the present disclosure.

FIG. 14 illustrates an example in which the electronic device measures the power consumption of the CPU and the network according to various embodiments proposed by the present disclosure.

Referring to FIG. 14, the electronic device may calculate current consumption (CPU current consumption and current consumption in a radio inactivation interval) in a wakeup burst interval preceding a time point at which the CPU wakes up. At this time, it is assumed that the screen is turned off.

For example, the electronic device may register a polling timer at a time point $t_0$ at which the screen is turned off. The electronic device may temporarily stop the polling timer at a time point $t_1$ at which the operation mode of the CPU switches to the sleep mode after registering the polling timer.

The electronic device may restart idle timer polling at each time point $t_2$, $t_4$, or $t_6$ at which the CPU wakes up until the screen is turned on. The electronic device may recognize a first polling time point after the restart of the idle timer polling as a time point at which power consumption is measured in the network tail and the CPU. That is, the electronic device may calculate CPU current consumption in the wakeup burst interval immediately before the first polling time point after the restart of the idle timer polling and current consumption in the radio inactivation interval.

Further, the electronic device may check a used amount of data in every polling cycle even while the CPU is awake and may calculate active radio activation power consumption according to the checked amount of data.

Figure 15A:
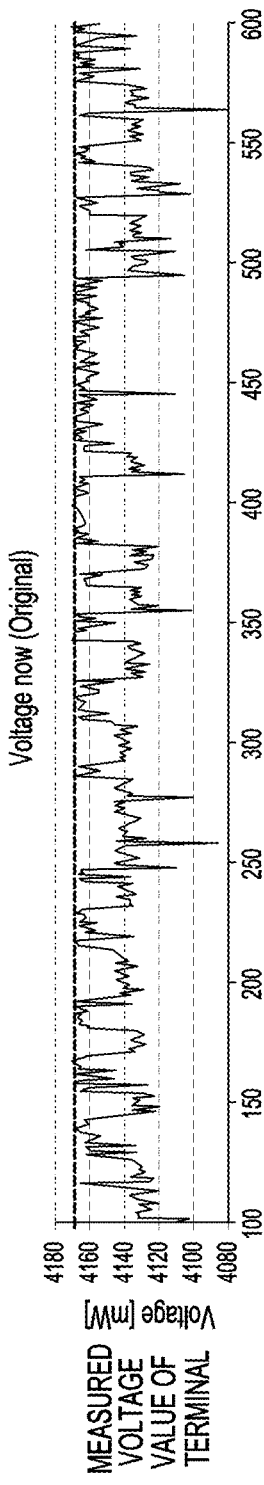
FIGS. 15A-15C illustrate an example in which the electronic device updates the power profile on the basis of an estimated value and a measured value according to various embodiments proposed by the present disclosure.
Figure 15B:
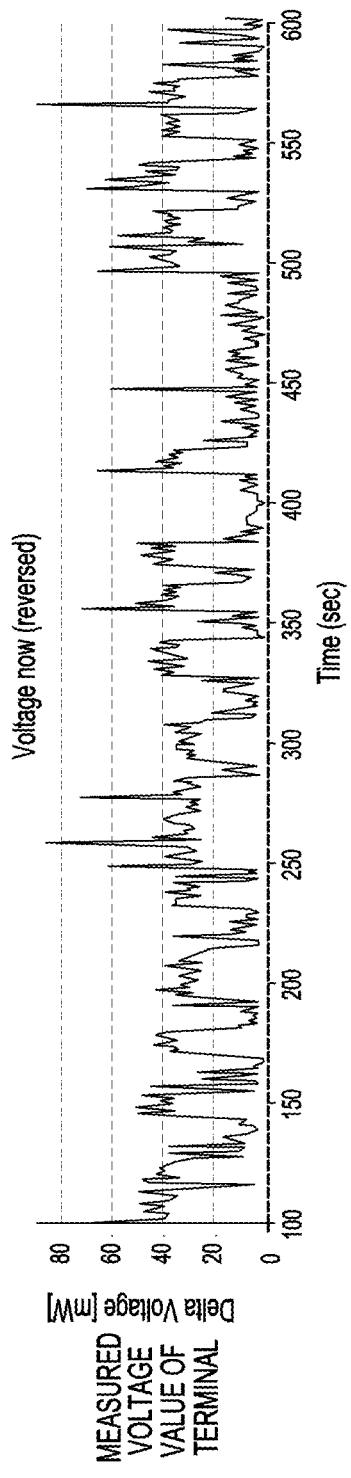
Figure 15C:
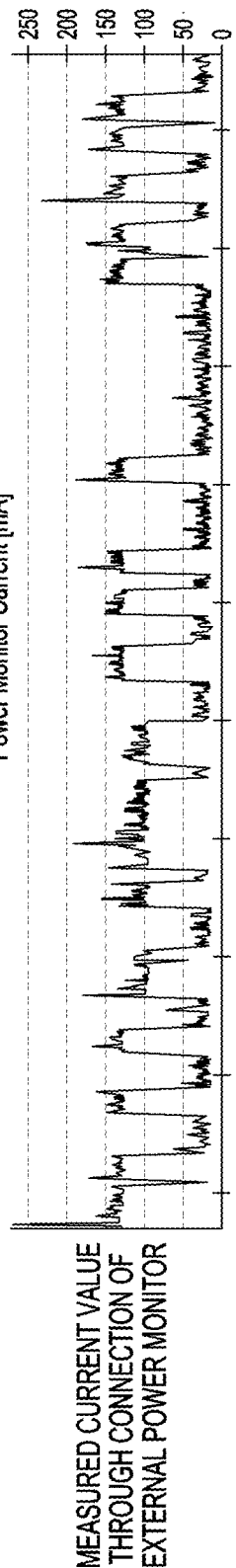

FIGS. 15A-15C illustrate an example in which the electronic device updates the power profile on the basis of an estimated value and a measured value according to various embodiments proposed by the present disclosure.

FIG. 15A illustrates a change in the output voltage of the battery measured by the electronic device, FIG. 15B illustrates a change in voltage consumption acquired using the measured change in the output voltage of the battery illustrated in FIG. 15A, and FIG. 15C illustrates a change in power consumption measured by an external power monitoring device.

Referring to FIGS. 15A-15C, the electronic device may measure a voltage output from the battery for a predetermined time (100 to 600 seconds, that is, during 500 seconds), and acquire a change in the output voltage according to the lapse of time on the basis of the measured voltage value (see FIG. 15A). The output voltage is inversely proportional to voltage consumption in the electronic device. That is, the output voltage is measured to be lower as the voltage consumption in the electronic device is larger, and the output voltage is measured to be higher as the voltage consumption in the electronic device is smaller.

When the electronic device acquires the change in the output voltage for a predetermined period, the electronic device may predict voltage consumption in the electronic device on the basis of the acquired change in the output voltage (see FIG. 15B). For example, a graph showing the change in the voltage consumption may be acquired by reversing the graph showing the change in the output voltage. As described above, this uses the characteristic that the voltage measured in the battery (output voltage) is inversely proportional to voltage consumption in the electronic device.

The electronic device may measure power consumption in the electronic device by performing an operation according to one or a plurality of applications and may acquire a change in power consumption for a predetermined time on the basis of power consumption in the electronic device according to the measurement (see FIG. 15C). The change in the power consumption can be measured by both an element included in the electronic device and a device installed outside the electronic device.

The electronic device may compare the change in the voltage consumption illustrated in FIG. 15B with the change in the power consumption illustrated in FIG. 15C and update the power profile on the basis of the comparison result.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of updating a power profile by an electronic device supporting a plurality of applications, the method comprising:
   identifying, in the electronic device, at least one target hardware component used for executing a target application;
   estimating power consumption of the at least one target hardware component in the electronic device based on unit power consumption corresponding to the at least one target hardware component, the each of the at least one target hardware component being set to the power profile;
   determining that an update of the power profile is required; and
   updating the power profile based on the estimated power consumption for the at least one target hardware component and a measured power consumption for the at least one target hardware component,
   wherein the unit power consumption is power consumption by the at least one target hardware component per unit time.

2. The method of claim 1, wherein updating the power profile comprises:
   executing the target application from among the plurality of applications; and
   measuring power consumption by the at least one target hardware component used for executing the target application.

3. The method of claim 2, further comprising:
   setting the target application as one category group from among predetermined category groups based on the at least one target hardware component,
   wherein the category groups correspond to combinations of target hardware components in the electronic device, respectively.

4. The method of claim 3, wherein updating the power profile comprises:
   identifying a category group set in a database in accordance with the target application, wherein the database is for managing the category groups set to correspond to the plurality of applications respectively; and
   updating information managed in accordance with the identified category group in the power profile.

5. The method of claim 4, wherein acquiring the power consumption comprises:
   setting a time interval for measuring the power consumption based on the category group set in the database in accordance with the target application; and
   measuring power consumption by the at least one target hardware component in the set time interval.

6. The method of claim 5, wherein updating the power profile further comprises instructing the update of the power profile according to execution of the target application based on the power consumption where the power consumption meets an adjustment requirement.

7. The method of claim 6, wherein:
   instructing the update comprises comparing the power consumption with set power consumption and instructing the update of the power profile according to execution of the target application based on a comparison result; and
   the set power consumption denotes power consumption managed for the set category group in the power profile.

8. The method of claim 2, further comprising generating a database for managing category groups set to correspond to the plurality of applications, respectively.

9. The method of claim 8, wherein acquiring the power consumption comprises:
   setting a time interval for measuring the power consumption based on the category group set in the database in accordance with the target application; and
   measuring power consumption by the at least one target hardware component in the set time interval.

10. The method of claim 1, wherein the each of the target hardware components comprises a bus, a processor, a memory, an input and output interface, a display, a communication interface, or a power management module in the electronic device.

11. An electronic device for updating a power profile, the electronic device comprising:
   an internal battery;
   hardware components configured to execute a plurality of applications installed in the electronic device; and
   a processor coupled with the internal battery and the hardware components and configured to:

identify, in the electronic device, at least one target hardware component used for executing a target application, estimate power consumption of the at least one target hardware component in the electronic device based on unit power consumption corresponding to the at least one target hardware component, the each of the at least one target hardware components being set to the power profile, determine that an update of the power profile is required, and update the power profile based on the estimated power consumption for the at least one target hardware component and a measured power consumption for the at least one target hardware component, wherein the unit power consumption denotes power consumption by the at least one target hardware component per unit time.

12. The electronic device of claim 11, wherein the processor is further configured to:

execute the target application from among the plurality of applications, measure power consumption by the at least one target hardware component used to execute the target application.

13. The electronic device of claim 12, wherein the processor is further configured to:

set the target application as one of predetermined category groups based on the at least one target hardware component, each of the category groups corresponding to each of combinations of the target hardware components in the electronic device, respectively.

14. The electronic device of claim 13, wherein the processor is further configured to:

identify the category group set in a database in accordance with the target application, wherein the database is for managing the category group set in accordance with each of the plurality of applications; and update information managed in accordance with the identified category group in the power profile.

15. The electronic device of claim 14, wherein the processor is further configured to:

if one target application is executed from among the plurality of applications, set a time interval for measuring the power consumption based on the category group set in the database in accordance with the target application; and measure power consumption by the at least one target hardware component in the set time interval.

16. The electronic device of claim 15, wherein the processor is further configured to, if the power consumption meets an adjustment requirement, update the power profile according to execution of the target application based on the power consumption.

17. The electronic device of claim 16, wherein:

the processor is further configured to compare the power consumption with set power consumption and instruct the update of the power profile according to execution of the target application based on a comparison result; and the set power consumption denotes power consumption managed for the set category group in the power profile.

18. The electronic device of claim 12, further comprising a memory configured to store a database for managing a category group set in accordance with each of the plurality of applications.

19. The electronic device of claim 18, wherein the processor is further configured to:

if one target application is executed from among the plurality of applications, set a time interval for measuring the power consumption based on the category group set in the database in accordance with the target application; and measure power consumption by the at least one target hardware component in the set time interval.

20. The electronic device of claim 11, wherein the each of the target hardware components comprises a bus, a processor, a memory, an input and output interface, a display, a communication interface, or a power management module in the electronic device.

\* \* \* \* \*